United States Patent
Cismas et al.

(10) Patent No.: US 9,280,513 B1
(45) Date of Patent: *Mar. 8, 2016

(54) MATRIX PROCESSOR PROXY SYSTEMS AND METHODS

(71) Applicant: Ovics, Saratoga, CA (US)

(72) Inventors: Sorin C. Cismas, Saratoga, CA (US); Ilie Garbacea, Santa Clara, CA (US)

(73) Assignee: OVICS, Saratoga, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 13/633,848

(22) Filed: Oct. 2, 2012

Related U.S. Application Data

(63) Continuation of application No. 12/168,849, filed on Jul. 7, 2008, now Pat. No. 8,327,114.

(51) Int. Cl.
*G06F 15/80* (2006.01)
*G06F 15/17* (2006.01)
*G06F 15/173* (2006.01)

(52) U.S. Cl.
CPC .......... *G06F 15/17312* (2013.01); *G06F 15/80* (2013.01)

(58) Field of Classification Search
CPC combination set(s) only.
See application file for complete search history.

(56) References Cited

U.S. PATENT DOCUMENTS

| | | | |
|---|---|---|---|
| 4,523,273 A * | 6/1985 | Adams et al. | 710/120 |
| 4,580,215 A | 4/1986 | Morton | |
| 4,803,617 A | 2/1989 | Berarducci | |
| 4,868,818 A | 9/1989 | Madan | |
| 4,922,408 A | 5/1990 | Davis | |
| 5,168,572 A | 12/1992 | Perkins | |
| 5,175,733 A | 12/1992 | Nugent | |
| 5,253,308 A | 10/1993 | Johnson | |
| 5,276,895 A | 1/1994 | Grondalski | |
| 5,280,607 A | 1/1994 | Bruck et al. | |
| 5,333,279 A | 7/1994 | Dunning | |
| 5,381,516 A | 1/1995 | Devos et al. | |
| 5,495,570 A | 2/1996 | Heugel | |
| 5,598,408 A | 1/1997 | Nickolls | |
| 5,602,839 A | 2/1997 | Annapareddy et al. | |
| 5,603,046 A | 2/1997 | Wiles et al. | |
| 5,644,517 A | 7/1997 | Ho | |
| 5,682,491 A | 10/1997 | Pechanek et al. | |

(Continued)

OTHER PUBLICATIONS

Pinkston, T.M., Flexible and Efficient Routing Based on Progressive Deadlock Recovery,1999, IEEE, IEEE Trans. on Computers, vol. 48,No. 7, pp. 649-669.*

(Continued)

*Primary Examiner* — Eric Coleman
(74) *Attorney, Agent, or Firm* — Meyertons, Hood, Kivlin, Kowert & Goetzel, P.C.

(57) ABSTRACT

Processor-to-processor (P-P) and/or broadcast proxies may be designated in a microprocessor matrix comprising a plurality of mesh-interconnected matrix processors when default processor-to-processor or broadcast routing algorithms used by data switches within the matrix to route messages would not deliver the messages to all intended recipients. The broadcast proxies broadcast messages within individual non-overlapping broadcast domains of the matrix. P-to-P and broadcast proxies may be designated as part of a boot-time testing/initialization sequence. Improving system fault tolerance allows improving semiconductor processing yields, which may be of particular significance in relatively large integrated circuits including large numbers of relatively-complex matrix processors.

18 Claims, 12 Drawing Sheets

(56) References Cited

U.S. PATENT DOCUMENTS

| | | | |
|---|---|---|---|
| 5,689,646 | A | 11/1997 | Thorson |
| 5,737,628 | A | 4/1998 | Birrittella et al. |
| 5,812,549 | A * | 9/1998 | Sethu .......................... 370/389 |
| 5,826,033 | A | 10/1998 | Hayashi et al. |
| 5,892,923 | A | 4/1999 | Yasuda et al. |
| 6,002,851 | A | 12/1999 | Basavaiah |
| 6,038,584 | A | 3/2000 | Balmer |
| 6,047,391 | A | 4/2000 | Younis |
| 6,115,763 | A | 9/2000 | Douskey |
| 6,128,720 | A | 10/2000 | Pechanek |
| 6,167,502 | A | 12/2000 | Pechanek et al. |
| 6,304,568 | B1 | 10/2001 | Kim |
| 6,651,157 | B1 | 11/2003 | Galles |
| 6,678,801 | B1 | 1/2004 | Greim |
| 6,678,840 | B1 | 1/2004 | Kessler |
| 6,681,316 | B1 | 1/2004 | Clermidy et al. |
| 6,691,216 | B2 | 2/2004 | Kelly |
| 6,711,693 | B1 | 3/2004 | Golden et al. |
| 6,769,008 | B1 | 7/2004 | Kumar |
| 6,816,562 | B2 | 11/2004 | Atkinson et al. |
| 6,820,174 | B2 | 11/2004 | Vanderwiel |
| 6,826,709 | B1 | 11/2004 | Clermidy et al. |
| 6,845,412 | B1 | 1/2005 | Boike |
| 6,851,009 | B1 | 2/2005 | Regula |
| 6,898,657 | B2 | 5/2005 | Smith |
| 6,950,391 | B1 | 9/2005 | Zadikian et al. |
| 6,973,517 | B1 | 12/2005 | Golden et al. |
| 7,017,158 | B2 | 3/2006 | Sasaki |
| 7,174,467 | B1 | 2/2007 | Helms |
| 7,185,226 | B2 | 2/2007 | Chen |
| 7,222,262 | B2 | 5/2007 | Prasadh |
| 7,231,543 | B2 | 6/2007 | Lee |
| 7,240,160 | B1 | 7/2007 | Hetherington |
| 7,281,055 | B2 | 10/2007 | Glasco |
| 7,401,333 | B2 | 7/2008 | Vandeweerd |
| 7,415,594 | B2 | 8/2008 | Doerr et al. |
| 7,424,698 | B2 | 9/2008 | Honary et al. |
| 7,461,236 | B1 | 12/2008 | Wentzlaff |
| 7,616,024 | B2 | 11/2009 | Kelem et al. |
| 7,706,275 | B2 * | 4/2010 | Archer et al. .................. 370/235 |
| 7,764,596 | B2 | 7/2010 | Saleh et al. |
| 7,765,385 | B2 | 7/2010 | Darrington et al. |
| 7,840,914 | B1 | 11/2010 | Agarwal et al. |
| 8,327,114 | B1 | 12/2012 | Cismas et al. |
| 2002/0018470 | A1 | 2/2002 | Galicki et al. |
| 2002/0176130 | A1 | 11/2002 | Maeno |
| 2003/0056084 | A1 | 3/2003 | Holgate |
| 2003/0065969 | A1 | 4/2003 | Lee et al. |
| 2003/0191855 | A1 | 10/2003 | Lee |
| 2003/0204768 | A1 | 10/2003 | Fee |
| 2004/0042796 | A1 | 3/2004 | Con-Carolis et al. |
| 2004/0047360 | A1 * | 3/2004 | Myers .......................... 370/406 |
| 2004/0073755 | A1 | 4/2004 | Webb et al. |
| 2004/0085994 | A1 | 5/2004 | Warren et al. |
| 2004/0215929 | A1 | 10/2004 | Floyd |
| 2005/0198522 | A1 | 9/2005 | Shaw et al. |
| 2006/0095724 | A1 | 5/2006 | Singh |
| 2006/0203825 | A1 | 9/2006 | Beigne et al. |
| 2006/0209846 | A1 | 9/2006 | Clermidy et al. |
| 2006/0212677 | A1 | 9/2006 | Fossum |
| 2006/0215544 | A1 | 9/2006 | Asa et al. |
| 2006/0241878 | A1 | 10/2006 | Jung et al. |
| 2007/0143578 | A1 | 6/2007 | Horton |
| 2007/0206521 | A1 | 9/2007 | Osaje |
| 2007/0242604 | A1 | 10/2007 | Takase et al. |
| 2008/0151909 | A1 * | 6/2008 | Scott et al. .................. 370/400 |
| 2008/0229059 | A1 | 9/2008 | May |
| 2009/0113308 | A1 | 4/2009 | Almasi et al. |
| 2009/0187756 | A1 | 7/2009 | Nollet et al. |
| 2009/0240915 | A1 | 9/2009 | Faraj |

OTHER PUBLICATIONS

USPTO, Office Action mailed Mar. 18, 2011 for U.S Appl. No. 12/168,837, filed Jul. 7, 2008.

USPTO, Office Action mailed Jun. 22, 2010 for U.S. Appl. No. 12/168,861, filed Jul. 7, 2008.

USPTO, Office Action mailed Apr. 21, 2010 for U.S. Appl. No. 12/168,857, filed Jul. 7, 2008.

USPTO, Office Action mailed Jan. 20, 2011 for U.S. Appl. No. 12/688,849, filed Jul. 7, 2008.

Office Action mailed Sep. 8, 2009 for U.S. Appl. No. 12/168,857.

U.S. Appl. No. 12/168,849, filed Jul. 7, 2008, entitled "Matrix Processor Proxy Systems and Methods," inventors Cismas et al.

U.S. Appl. No. 12/168,853, filed Jul. 7, 2008, entitled "Matrix Processor Data Switch Routing Systems and Methods," inventors Cismas et al.

U.S. Appl. No. 12/168,857, filed Jul. 7, 2008, entitled "Matrix Processor Control Message Transmission Systems and Methods," inventors Cismas et al.

U.S. Appl. No. 12/168,861, filed Jul. 7, 2008, entitled "Matrix Processor Data Streaming Systems and Methods," inventors Cismas et al.

* cited by examiner

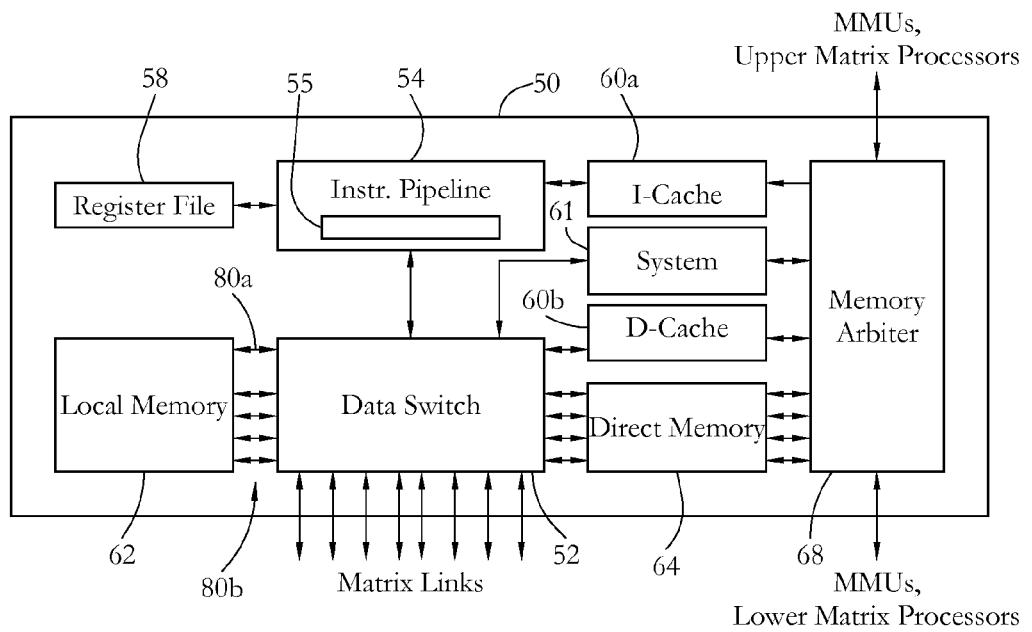
FIG. 2-A
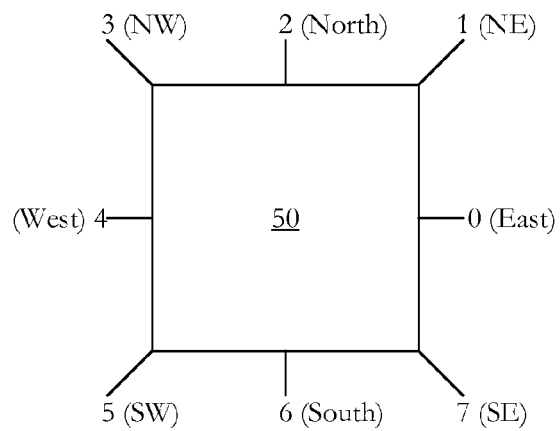
FIG. 2-B

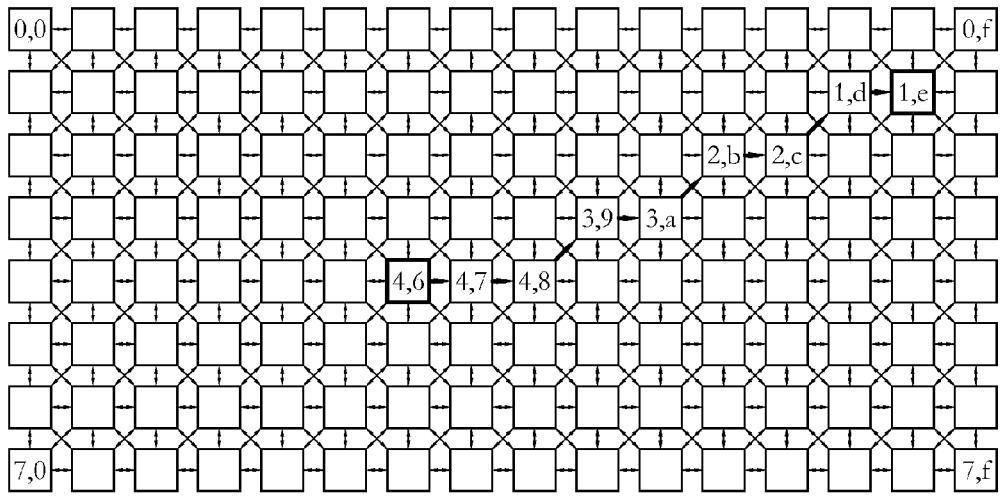

FIG. 4-A

```
DeltaH = DstH – CurrH;
DeltaV = DstV – CurrV;
if    (DeltaH == 0 && DeltaV == 0) {          // this is the destination
  issue_interrupt;
}
else if (DeltaH >  0 && DeltaV <= 0) {          // first quadrant
  if    (   DeltaH > 2 * -DeltaV) use_Link0;  // E
  else if (2 *  DeltaH <    -DeltaV) use_Link2;  // N
  else                    use_Link1;  // NE
}
else if (DeltaH <= 0 && DeltaV <  0) {          // second quadrant
  if    (2 * -DeltaH <    -DeltaV) use_Link2;  // N
  else if (   -DeltaH > 2 * -DeltaV) use_Link4;  // W
  else                    use_Link3;  // NW
}
else if (DeltaH <  0 && DeltaV >= 0) {          // third quadrant
  if    (   -DeltaH > 2 *  DeltaV) use_Link4;  // W
  else if (2 * -DeltaH <     DeltaV) use_Link6;  // S
  else                    use_Link5;  // SW
}
else if (DeltaH >= 0 && DeltaV >  0) {          // fourth quadrant
  if    (2 *  DeltaH <     DeltaV) use_Link6;  // S
  else if (    DeltaH > 2 *  DeltaV) use_Link0;  // E
  else                    use_Link7;  // SE
}
```

FIG. 4-B

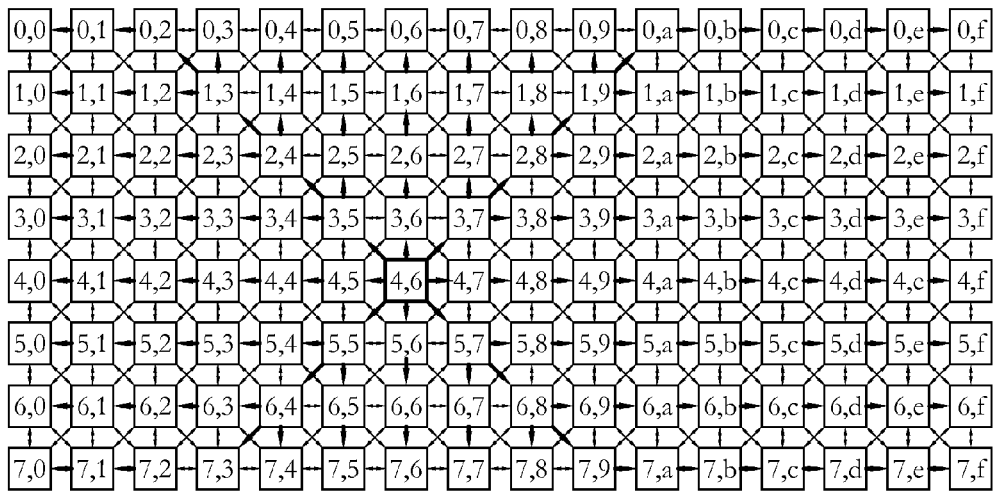

FIG. 5-A

```
DeltaH = CurrH - SrcH;
DeltaV = CurrV - SrcV;
if     (DeltaH == 0 && DeltaV == 0) use_all_Links; // this is the source
else if (DeltaH >  0 && DeltaV <= 0) {          // first quadrant
   if ( DeltaH >= -DeltaV) use_Link0;           // E
   if ( DeltaH == -DeltaV) use_Link1;           // NE
   if ( DeltaH <= -DeltaV) use_Link2;           // N
}
else if (DeltaH <= 0 && DeltaV <  0) {          // second quadrant
   if (-DeltaH <= -DeltaV) use_Link2;           // N
   if (-DeltaH == -DeltaV) use_Link3;           // NW
   if (-DeltaH >= -DeltaV) use_Link4;           // W
}
else if (DeltaH <  0 && DeltaV >= 0) {          // third quadrant
   if (-DeltaH >=  DeltaV) use_Link4;           // W
   if (-DeltaH ==  DeltaV) use_Link5;           // SW
   if (-DeltaH <=  DeltaV) use_Link6;           // S
}
else if (DeltaH >= 0 && DeltaV >  0) {          // fourth quadrant
   if ( DeltaH <=  DeltaV) use_Link6;           // S
   if ( DeltaH ==  DeltaV) use_Link7;           // SE
   if ( DeltaH >=  DeltaV) use_Link0;           // E
}
```

FIG. 5-B

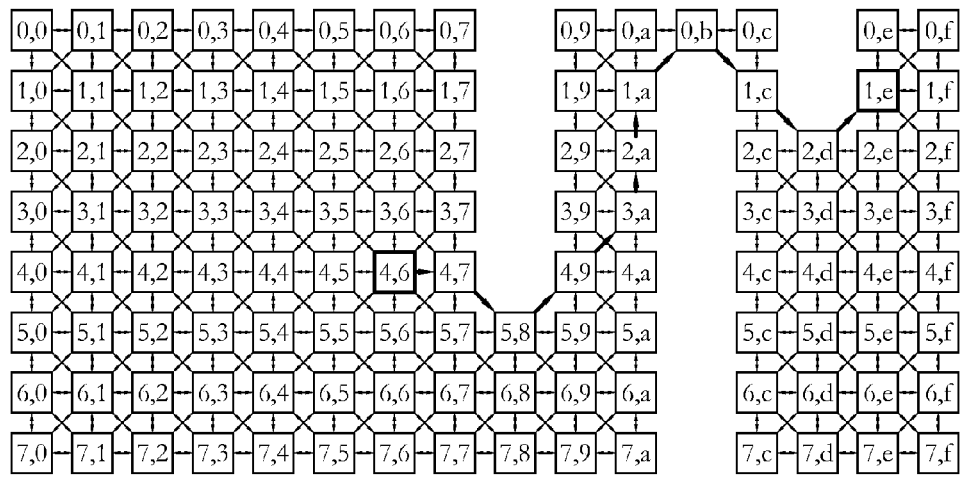

FIG. 6-A

```
DeltaH = DstH – CurrH;
DeltaV = DstV – CurrV;
if     (DeltaH == 0 && DeltaV == 0) {        // this is the destination
issue_interrupt;
}
else if (DeltaH > 0 && DeltaV <= 0) {        // first quadrant
if    (    DeltaH > 2 * -DeltaV) use_Link0172;  // E   - ENE
else if (   DeltaH >     -DeltaV) use_Link1027;  // ENE - NE
else if (2 * DeltaH >    -DeltaV) use_Link1203;  // NE  - NNE
else                      use_Link2130;  // NNE - N
}
else if (DeltaH <= 0 && DeltaV < 0) {        // second quadrant
if    (2 * -DeltaH <    -DeltaV) use_Link2314;  // N   - NNW
else if (   -DeltaH <    -DeltaV) use_Link3241;  // NNW - NW
else if (   -DeltaH < 2 * -DeltaV) use_Link3425;  // NW  - WNW
else                      use_Link4352;  // WNW - W
}
else if (DeltaH < 0 && DeltaV >= 0) {        // third quadrant
if    (    -DeltaH > 2 * DeltaV) use_Link4536;  // W   - WSW
else if (   -DeltaH >     DeltaV) use_Link5463;  // WSW - SW
else if (2 * -DeltaH >    DeltaV) use_Link5647;  // SW  - SSW
else                      use_Link6574;  // SSW - S
}
else if (DeltaH >= 0 && DeltaV > 0) {        // fourth quadrant
if    (2 * DeltaH <     DeltaV) use_Link6750;  // S   - SSE
else if (   DeltaH <     DeltaV) use_Link7605;  // SSE - SE
else if (   DeltaH < 2 * DeltaV) use_Link7061;  // SE  - ESE
else                      use_Link0716;  // ESE - E
}
```

FIG. 6-B

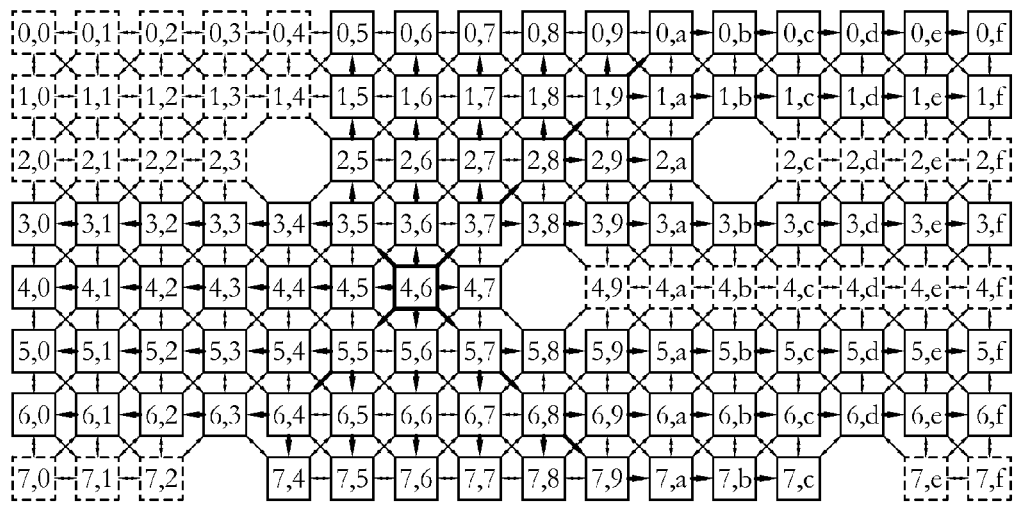
FIG. 9-A
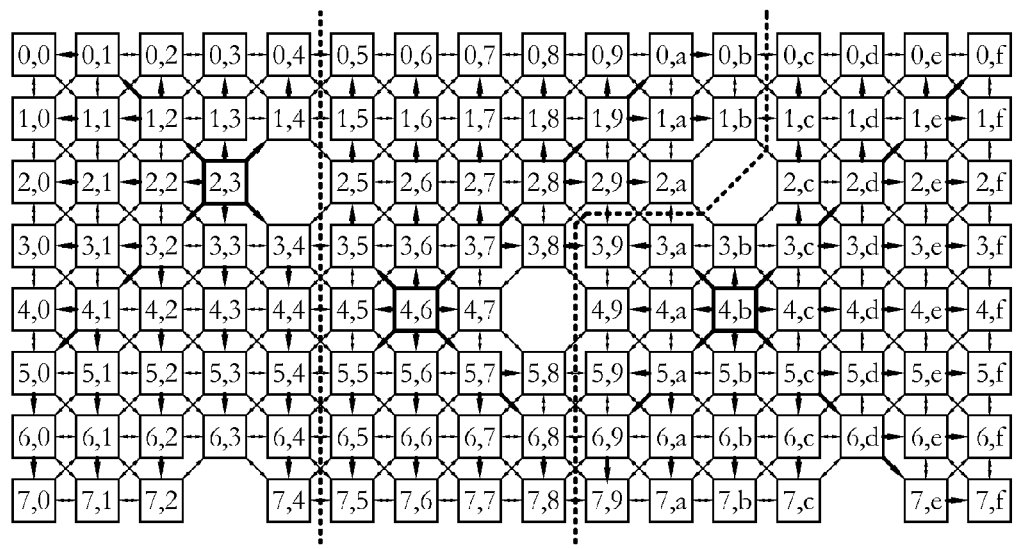
FIG. 9-B

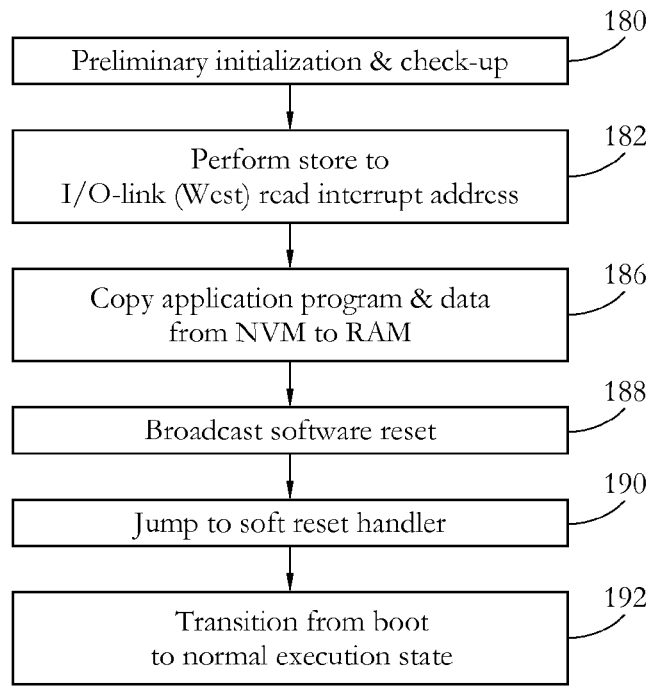
FIG. 10-A
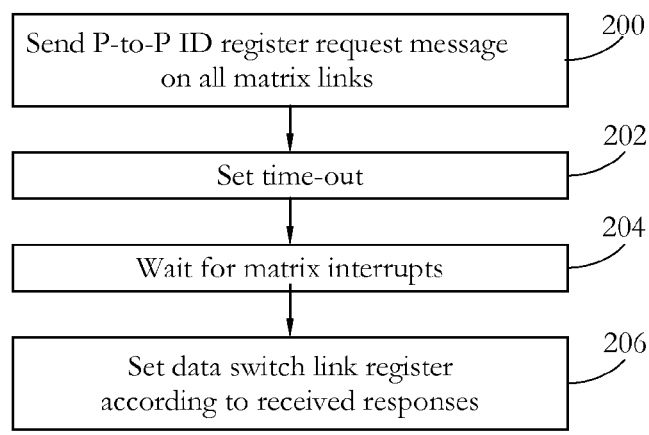
FIG. 10-B

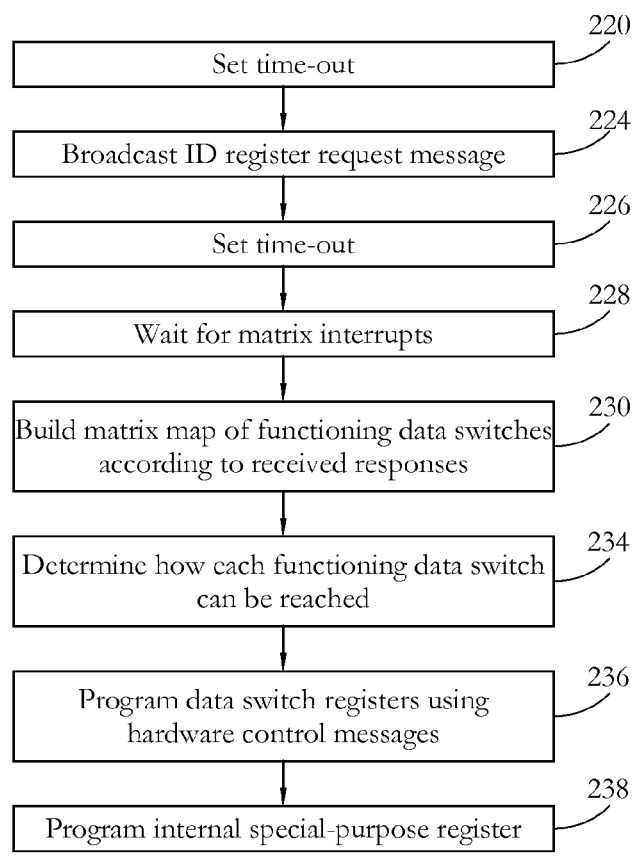
FIG. 10-C

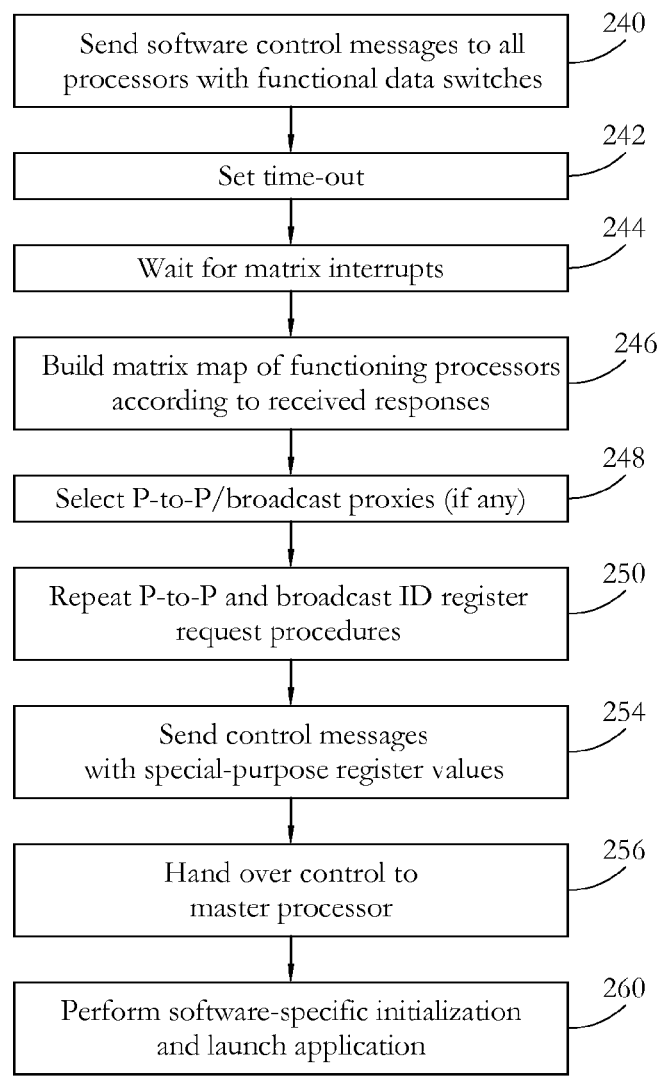
FIG. 10-D

MATRIX PROCESSOR PROXY SYSTEMS AND METHODS

RELATED APPLICATION DATA

This application is a continuation of U.S. patent application Ser. No. 12/168,849, filed on Jul. 7, 2008, entitled "Matrix Processor Proxy Systems and Methods," first inventor Cismas, which is herein incorporated by reference.

FIELD OF THE INVENTION

This invention relates to digital integrated circuits, and in particular to multi-processor (multi-core) data processing systems and methods.

BACKGROUND OF THE INVENTION

The progress of semiconductor technologies has often outpaced the progress and evolution of computer architecture. Scaling down the size of semiconductor components allows higher logic densities. At the same time, scaling down the size of semiconductor features introduces new challenges. Such challenges may involve leakage current, power consumption, an inability to increase performance by increasing clock frequencies, and memory bandwidth capabilities that do not keep up with improved logic performance. The limitations of current processing systems are often most apparent in mobile/handheld devices.

SUMMARY OF THE INVENTION

According to one aspect, a method comprises: determining whether a default matrix processor-to-processor routing algorithm would deliver an inter-processor message from a first matrix processor to a second matrix processor in a chip comprising a microprocessor matrix of mesh-interconnected matrix processors, wherein the message routed according to the default matrix processor-to-processor routing algorithm would be routed from the first matrix processor by a data switch in each matrix processor along a default message path originating at the first matrix processor; in response to determining whether the default matrix processor-to-processor routing algorithm would deliver the message from the first matrix processor to the second matrix processor, when the default processor-to-processor routing algorithm would not deliver the message from the first matrix processor to the second processor, determining whether designating a third matrix processor as a proxy for the message would cause the message to be delivered to the second matrix processor using the default matrix processor-to-processor routing algorithm from the first matrix processor to the third matrix processor and subsequently from the third matrix processor to the second matrix processor, wherein the third matrix processor is not in the default message path; and in response to determining whether designating the third matrix processor as a proxy for the message would cause the message to be delivered to the second matrix processor, designating the third matrix processor as a proxy for the message when designating the third matrix processor as a proxy for the message would cause the message to be delivered to the second matrix processor.

According to another aspect, an integrated circuit comprises: a microprocessor matrix comprising a plurality of mesh-interconnected matrix processors integrated on a chip, wherein each matrix processor comprises a data switch configured to direct inter-processor communications within the matrix; and a proxy identification unit. The proxy identification unit is configured to: determine whether a default matrix processor-to-processor routing algorithm would deliver an inter-processor message from a first matrix processor to a second matrix processor, the message being routed according to the default matrix processor-to-processor routing algorithm along a default message path originating at the first matrix processor; in response to determining whether the default matrix processor-to-processor routing algorithm would deliver the message from the first matrix processor to the second matrix processor, when the default processor-to-processor routing algorithm would not deliver the message from the first matrix processor to the second processor, determine whether designating a third matrix processor as a proxy for the message would cause the message to be delivered to the second matrix processor using the default matrix processor-to-processor algorithm from the first matrix processor to the third matrix processor and subsequently from the third matrix processor to the second matrix processor, wherein the third matrix processor is not in the default message path; and in response to determining whether designating the third matrix processor as a proxy for the message would cause the message to be delivered to the second matrix processor, designate the third matrix processor as a proxy for the message when designating the third matrix processor as a proxy for the message would cause the message to be delivered to the second matrix processor.

According to another aspect, a system comprises: means for determining whether a default matrix processor-to-processor routing algorithm would deliver an inter-processor message from a first matrix processor to a second matrix processor in a chip comprising a microprocessor matrix of mesh-interconnected matrix processors, wherein the message routed according to the default matrix processor-to-processor routing algorithm would be routed from the first matrix processor by a data switch in each matrix processor along a default message path originating at the first matrix processor; means, responsive to the means for determining whether the default matrix processor-to-processor routing algorithm would deliver the message from the first matrix processor to the second matrix processor, for determining whether designating a third matrix processor as a proxy for the message would cause the message to be delivered to the second matrix processor using the default matrix processor-to-processor routing algorithm from the first matrix processor to the third matrix processor and subsequently from the third matrix processor to the second matrix processor, wherein the third matrix processor is not in the default message path; and means, responsive to the means for determining whether designating the third matrix processor as a proxy, for designating the third matrix processor as a proxy for the message when designating the third matrix processor as a proxy for the message would cause the message to be delivered to the second matrix processor.

According to another aspect, a method comprises: sending an inter-processor message from a sender matrix processor to a receiver matrix processor through a proxy matrix processor in a chip comprising a microprocessor matrix of mesh-interconnected matrix processors, the message sent by the sender matrix processor designating the proxy matrix processor and the receiver matrix processor; and employing data switches in each matrix processor along a path of the message to route the message from the sender matrix processor to the receiver matrix processor through the proxy matrix processor using a default processor-to-processor routing algorithm from the sender matrix processor to the proxy matrix processor and subsequently from the proxy matrix processor to the receiver matrix processor. A tentative non-proxy message sent by the sender matrix processor to the receiver matrix processor through the microprocessor matrix using the default processor-to-processor routing algorithm would not travel through the proxy matrix processor and would not reach the receiver matrix processor.

According to another aspect, a chip comprises a microprocessor matrix of mesh-interconnected matrix processors. The microprocessor matrix comprises: a sender matrix processor integrated on the chip, the sender matrix processor including a data switch configured to send an inter-processor message to a receiver matrix processor through the microprocessor matrix, the message sent by the sender matrix processor including a designation of the receiver matrix processor and of a proxy matrix processor through which the message is to be routed; a receiver matrix processor integrated on the chip, the receiver matrix processor including a data switch configured to receive the message; and a proxy matrix processor integrated on the chip, the proxy matrix processor including a data switch configured to receive the message from the sender and to send the message to the receiver. The message is routed by each matrix processor in a message path according to a default processor-to-processor routing algorithm from the sender matrix processor to the proxy matrix processor, and subsequently from the proxy matrix processor to the receiver matrix processor. A tentative non-proxy message sent by the sender matrix processor to the receiver matrix processor through the microprocessor matrix using the default processor-to-processor routing algorithm would not travel through the proxy matrix processor and would not reach the receiver matrix processor.

BRIEF DESCRIPTION OF THE DRAWINGS

The foregoing aspects and advantages of the present invention will become better understood upon reading the following detailed description and upon reference to the drawings where:

FIG. 2-A shows an exemplary internal structure of a matrix processor of FIG. 1, according to some embodiments of the present invention.

FIG. 2-B shows an exemplary matrix link numbering for a matrix processor connected to its neighbors over eight matrix link, according to some embodiments of the present invention.

FIG. 4-A shows an exemplary path of a processor-to-processor message in a multi-processor matrix in which all inter-processor links are in working condition, according to some embodiments of the present invention.

FIG. 4-B shows exemplary code describing a processor-to-processor message routing method according to some embodiments of the present invention.

FIG. 5-A shows an exemplary path of a broadcast message in a multi-processor matrix in which all inter-processor links are in working condition, according to some embodiments of the present invention.

FIG. 5-B shows exemplary code describing a broadcast message routing method according to some embodiments of the present invention.

FIG. 6-A shows an exemplary path of a processor-to-processor message in a multi-processor matrix in the presence of some inter-processor communication failures, according to some embodiments of the present invention.

FIG. 6-B shows exemplary code describing a fault-tolerant processor-to-processor message routing method according to some embodiments of the present invention.

FIG. 9-A shows an exemplary path of a broadcast message in the presence of a number of inter-processor communication failures in a single-domain matrix, according to some embodiments of the present invention.

FIG. 9-B shows an exemplary path of a broadcast message in a matrix comprising multiple broadcast domains, according to some embodiments of the present invention.

FIG. 10-A shows a preliminary boot sequence performed by a boot processor according to some embodiments of the present invention.

FIG. 10-B shows an initialization sequence performed by the kernel of each matrix processor according to some embodiments of the present invention.

FIG. 10-C shows a sequence of steps performed by the kernel of the boot processor to identify functional data switches/inter-processor links within the processor matrix, according to some embodiments of the present invention.

FIG. 10-D shows a sequence of steps performed by the kernel of the boot matrix processor to identify functional processing pipelines within the processor matrix, according to some embodiments of the present invention.

DETAILED DESCRIPTION OF THE INVENTION

The following description illustrates the present invention by way of example and not necessarily by way of limitation. Any reference to an element is understood to refer to at least one element. A set of elements is understood to include one or more elements. A plurality of elements includes at least two elements. Unless otherwise specified, each recited element or structure can be formed by or be part of a single structure or unit, or be formed from multiple distinct structures or units. Unless otherwise specified, any recited electrical or mechanical connections can be direct connections or indirect operative connections established through intermediary circuit elements or structures. An inter-processor link including non-contentious data and control channels is capable of transferring on the same clock cycle at least some data messages over the data channel and at least some control messages over the control channel without mutual contention; a transmission of at least some control messages over the control channel does not directly affect a concurrent transmission of at least some data messages over the data channel, and vice versa. A data switch configured to route control messages autonomously with respect to a corresponding instruction processing pipeline is capable of routing at least some control messages without the execution of corresponding instructions by the instruction processing pipeline; such a data switch may also be capable of sending control messages in response to execution of corresponding instructions by the instruction processing pipeline. The statement that two or more events or actions happen synchronously is understood to mean that the events/action happen within the same clock cycle. The statement that a data switch transfers two data streams concurrently is understood to mean that the transfers of the two data streams by the data switch overlap temporally, i.e. that at least on some clock cycles the data switch transfers parts of both data streams; two such streams need not start/end on the same clock cycles.

The following description illustrates embodiments of the invention by way of example and not necessarily by way of limitation.

The systems and methods described below are particularly suited for implementation using deep sub-micron technologies, where processing elements are small and operate at low power levels. Exemplary systems and methods as described herein may allow minimizing data movement, which substantially affects system power consumption, performance, and allowable die size characteristics.

Figure 1:
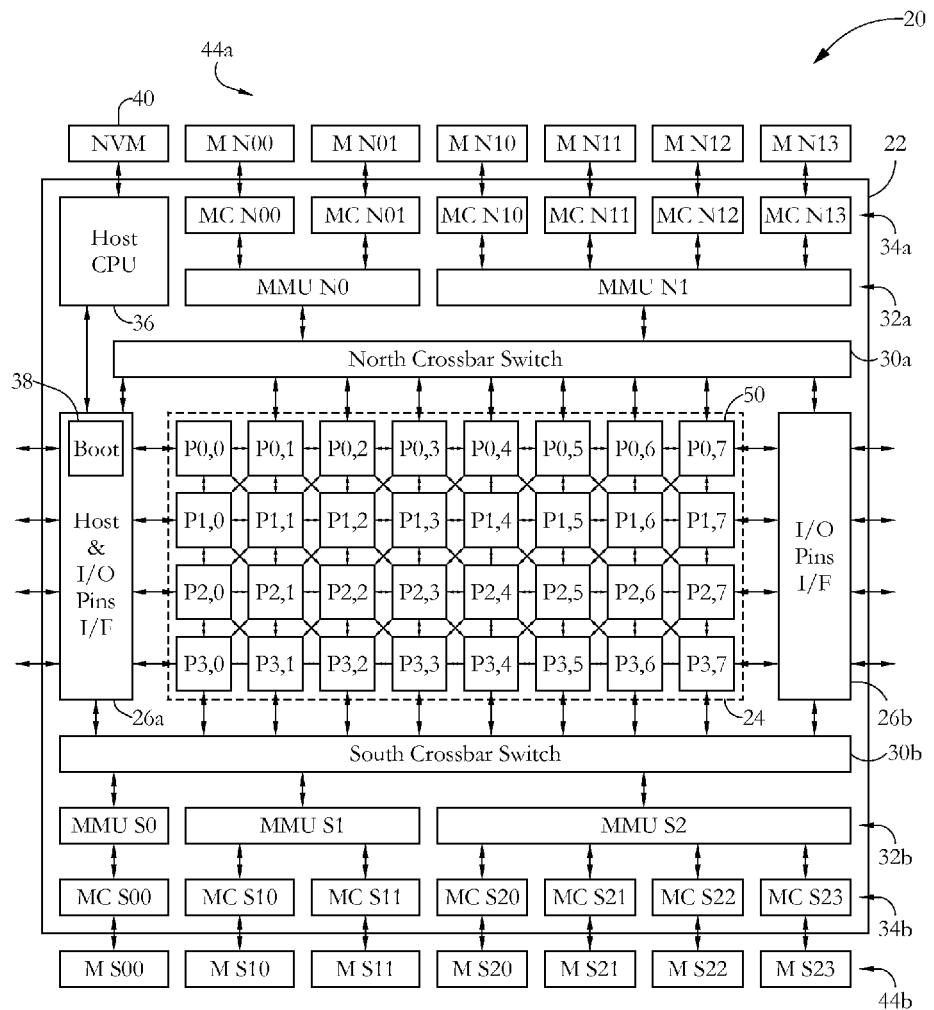
FIG. 1 shows an exemplary data processing system including a processor matrix according to some embodiments of the present invention.

FIG. 1 shows an exemplary data processing system 20 according to some embodiments of the present invention. Data processing system 20 comprises an integrated circuit 22 including a processor matrix 24. Processor matrix 24 is connected to I/O pin/host interfaces 26a-b and north/south crossbar switches 30a-b. Crossbar switches 30a-b connect processor matrix 24 to a plurality of memory management units (MMUs) 32a-b, which control the operation of a plurality of memory controllers (MCs) 34a-b, respectively. Integrated circuit 22 may also include a host CPU 36, which may be connected to processor matrix 24 through a host & I/O pin interface 26a. Host CPU 36 may be a conventional single-core or multi-core processor, such as a processor based on an x86, ARM, MIPS, or SPARC architecture. Interface 26a may include or otherwise be connected to a boot controller 38. Boot controller 38 may include a boot finite state machine (FSM) for initiating a processor matrix boot sequence described below, as well as a boot read-only memory (ROM) storing data for booting processor matrix 24 and/or host CPU 36. Host CPU 36 may also be connected to a non-volatile memory 40, which may include for example flash memory. Memory controllers 34a-b are connected to respective random access memory (RAM) units 44a-b. Each memory controller 34a-b services a single memory channel, while each MMU 32a-b interleaves access to its associated memory channels in order to increase memory bandwidth utilization. In some embodiments, each memory channel may use one or more ranks of memories, each with one or more DDRx chips.

In some embodiments, system 20 need not include all the components shown in FIG. 1. An exemplary system may include only one of the north/south memory subsystems shown in FIG. 1, and/or a single memory management unit. As a further example, a system including a single memory management unit need not include the crossbar switches shown in FIG. 1.

Matrix 24 includes a plurality of mesh-interconnected matrix processors (cores, also denoted below as OVP) 50 arranged in a cartesian (x-y) array configuration. Each matrix processor 50 may be assigned to a specified subtask of a computationally-intensive application. The assignment of processors 50 to application tasks may be performed by the application and/or load-balancing software known in the art. The assignment may be performed after a number of testing and initialization steps described below, which identify any fully- or partially-non-functional matrix processors 50 (e.g. matrix processors 50 having non-functional data switches and/or instruction pipelines, described below).

FIG. 1 shows an exemplary 8×4 matrix configuration, with matrix processors 50 denoted by their x- and y-indices. Each matrix processor 50 is directly connected through a dedicated data read, data write, control read and control write connection to each of its horizontal, vertical, and diagonal immediate neighbors. Corner matrix processors are directly connected to three other matrix processors, non-corner edge matrix processors are directly connected to five other matrix processors, and internal matrix processors are directly connected to eight other matrix processors. In the exemplary configuration of FIG. 1, north and south edge matrix processors P0,0-P0,7, P3,0-P3,7 are directly connected to north and south crossbar switches 30a-b, respectively, while west and east edge matrix processors P0,0-P3,0, P0,7-P3,7 are directly connected to I/O pin/host interfaces 26a-b, respectively.

Each matrix processor 50 is connected to one or both of the north and south memory subsystems formed by MMUs 32a-b and MCs 34a-b. In some embodiments, each matrix processor is connected to the north memory subsystem including MMUs 32a and MCs 34a, and the south memory subsystem is not present or operative. In some embodiments, each matrix processor column is connected to the north memory subsystem over a set of three uni-directional buses including a transaction address, a write data, and a read data bus.

In some embodiments, some or all matrix processors 50 are programmable processors, each including an instruction pipeline configured to execute software instructions. In some embodiments, at least some of matrix processors 50 may be co-processors. A co-processor may include special-purpose hardware (logic) instead of a programmable instruction-processing pipeline, but otherwise may include the inter-processor communication functions of other matrix processors, described below.

In some embodiments, one or more matrix processors 50 are configured to act as a boot processor to execute a boot/initialization sequence after each hard reset and/or other events. For example, the upper-left (0,0) matrix processor 50 may be configured to act as a boot processor by default, and the matrix processors 50 in the left column may be configured to act as backup boot processors in order of priority going down the column if the matrix processor(s) above are not capable of functioning as boot processors. In addition, one or more matrix processors 50 may be designated as a master processor before or after boot. A master processor may have enhanced privileges and may be capable of selectively performing some operations (e.g. broadcasting messages, domain partitioning, enabling/disabling inter-processor links) that are not permitted for non-master matrix processors 50. A master processor may be the boot processor, or may be chosen to be a processor near the physical center of matrix 24 in order to reduce the maximum travel time of messages from the master matrix processor to other matrix processors 50.

Matrix Processor Structure

FIG. 2-A shows an exemplary internal structure of a matrix processor 50 according to some embodiments of the present invention. Matrix processor 50 includes a hardware data switch 52 controlling inter-processor communications as described below, and a programmable instruction processing pipeline 54 performing processing operations on incoming data according to a sequence of instructions. Pipeline 54 may include one or more arithmetic logic units (ALU). Pipeline 54 is connected to data switch 52, a register file 58, and an instruction cache (I-cache) 60a. Data switch 52 is further connected to a local memory 62, a system controller 61, a data cache (D-cache) 60b, and a direct memory access (DMA) controller 64. Caches 60a-b, system controller 61 and DMA controller 64 are connected to external MMUs through a memory arbiter 68. Memory arbiter 68 is connected to MMUs 32a-b through crossbar switches 30a-b and any intervening matrix processors 50; the memory arbiters of north and south edge matrix processors 50 are directly connected to crossbar switches 30a or 30b, while the memory arbiters of internal matrix processors 50 are directly connected to the memory arbiters of their immediate North and South neighbors. In some embodiments, the connections of matrix processors 50 to MMUs 32*a-b* through memory arbiters 68 generally provide higher latency and lower bandwidth than the connections to other matrix processors and I/O interfaces 26*a-b* through data switches 52.

In some embodiments, pipeline 54 and/or the other units connected to data switch 52 in FIG. 2-A may include or be implemented using a conventional processor such as a multi-threaded or single-threaded processor based on an x86, ARM, MIPS, or SPARC architecture. In some embodiments, all ports shown in FIG. 2-A are uni-directional full duplex ports. Using such ports allows avoiding bus arbitration and switching, and allows achieving higher performance and lower power consumption. In some embodiments, each port shown in FIG. 2-A includes independent control and data ports, in order to allow matrix processors to exchange control messages without interrupting the streaming of data on the data ports as described below.

In some embodiments, system controller 61 implements one or more system control functions such as a memory virtualization function. System controller 61 may include a translation lookaside buffer (TLB) useful for improving the speed of virtual address translation and facilitating memory virtualization.

In some embodiments, all the ports of data switch 52 are memory mapped; pipeline 54 is capable of writing to such ports directly. Table 1 shows an exemplary division of a 4-Gbyte address space in a system using a 32-bit addressing space. Matrix links may be denoted as OVP Links in Table 1 and other tables below.

TABLE 1

Exemplary Matrix Processor Memory Map

| Address Range | Description |
| --- | --- |
| 0x0000_0000-0x7fff_ffff | Cached Memory (2 GBytes) |
| 0x8000_0000-0xbfff_ffff | Local Memory (1 GByte) |
| 0xc000_0000-0xc0ff_ffff | Direct Memory Control Port 0 (16 Mbytes) |
| 0xc100_0000-0xc1ff_ffff | Direct Memory Control Port 1 (16 Mbytes) |
| 0xc200_0000-0xc2ff_ffff | Direct Memory Control Port 2 (16 Mbytes) |
| 0xc300_0000-0xc3ff_ffff | Direct Memory Control Port 3 (16 Mbytes) |
| 0xc400_0000-0xc4ff_ffff | Local Memory Control Port 0 (16 Mbytes) |
| 0xc500_0000-0xc5ff_ffff | Local Memory Control Port 1 (16 Mbytes) |
| 0xc600_0000-0xc6ff_ffff | Local Memory Control Port 2 (16 Mbytes) |
| 0xc700_0000-0xc7ff_ffff | Local Memory Control Port 3 (16 Mbytes) |
| 0xc800_0000-0xc8ff_ffff | OVP Control Link 0 (16 Mbytes) |
| 0xc900_0000-0xc9ff_ffff | OVP Control Link 1 (16 Mbytes) |
| 0xca00_0000-0xcaff_ffff | OVP Control Link 2 (16 Mbytes) |
| 0xcb00_0000-0xcbff_ffff | OVP Control Link 3 (16 Mbytes) |
| 0xcc00_0000-0xccff_ffff | OVP Control Link 4 (16 Mbytes) |
| 0xcd00_0000-0xcdff_ffff | OVP Control Link 5 (16 Mbytes) |
| 0xce00_0000-0xceff_ffff | OVP Control Link 6 (16 Mbytes) |
| 0xcf00_0000-0xcfff_ffff | OVP Control Link 7 (16 Mbytes) |
| 0xd000_0000-0xd0ff_ffff | Direct Memory Data Port 0 (16 Mbytes) |
| 0xd100_0000-0xd1ff_ffff | Direct Memory Data Port 1 (16 Mbytes) |
| 0xd200_0000-0xd2ff_ffff | Direct Memory Data Port 2 (16 Mbytes) |
| 0xd300_0000-0xd3ff_ffff | Direct Memory Data Port 3 (16 Mbytes) |
| 0xd400_0000-0xd4ff_ffff | Local Memory Data Port 0 (16 Mbytes) |
| 0xd500_0000-0xd5ff_ffff | Local Memory Data Port 1 (16 Mbytes) |
| 0xd600_0000-0xd6ff_ffff | Local Memory Data Port 2 (16 Mbytes) |
| 0xd700_0000-0xd7ff_ffff | Local Memory Data Port 3 (16 Mbytes) |
| 0xd800_0000-0xd8ff_ffff | OVP Link Data Link 0 (16 Mbytes) |
| 0xd900_0000-0xd9ff_ffff | OVP Link Data Link 1 (16 Mbytes) |
| 0xda00_0000-0xdaff_ffff | OVP Link Data Link 2 (16 Mbytes) |
| 0xdb00_0000-0xdbff_ffff | OVP Link Data Link 3 (16 Mbytes) |
| 0xdc00_0000-0xdcff_ffff | OVP Link Data Link 4 (16 Mbytes) |
| 0xdd00_0000-0xddff_ffff | OVP Link Data Link 5 (16 Mbytes) |
| 0xde00_0000-0xdeff_ffff | OVP Link Data Link 6 (16 Mbytes) |
| 0xdf00_0000-0xdfff_ffff | OVP Link Data Link 7 (16 Mbytes) |

TABLE 1-continued

Exemplary Matrix Processor Memory Map

| Address Range | Description |
| --- | --- |
| 0xe000_0000-0xefff_ffff | System Controller (256 Mbytes) |
| 0xf000_0000-0xffff_ffff | Boot Memory (256 Mbytes) |

FIG. 2-B shows an exemplary relationship between matrix directions and matrix link indices such as the link indices (0-7) listed of Table 1. The East direction may be defined as Link 0, with the link index increasing by one as the direction is changed counterclockwise to North-East, North, North-West, West, South-West, South, and South-East.

In some embodiments, the matrix control interfaces are used by the instruction processing pipeline kernel of each matrix processor 50 to exchange control messages with other matrix processor kernels. In some embodiments, control messages sent by a pipeline 54 of a matrix processor 50 are routed by the data switch 52 of that matrix processor and by data switches of intervening matrix processor(s) 50 en route to the message destination, without any software involvement or control by any pipelines 54 of intervening matrix processors 50. Kernels of two immediately neighboring matrix processors 50 may exchange control messages over a control channel at the same time (on the same clock cycle) as user threads in the two processors exchange data over the corresponding data channel between the processors. In some embodiments, control messages include broadcast messages sent to all processors in matrix 24, and processor-to-processor (P-to-P) messages sent to designated recipient processors. Depending on how messages are processed at the destination matrix processor(s) 50, control messages may also be classified as hardware or software messages. Hardware messages may be used to control low-level functions of matrix 24, such as soft reset and non-maskable interrupts, boot sequence, clock frequency, and voltage level. Software messages may be used to implement message-passing protocols and inter-processor synchronization, such as support for transactional memory, thread software interrupts, Compare-And-Swap, Load-Linked and Store-Conditional.

In some embodiments, as long as any two neighboring matrix processors 50 use the same clock, data and control messages sent between the two matrix processors incur only one cycle delay (messages move at one cycle per hop/processor). Double registers may be used on all matrix link interfaces, on one side, in order to decouple the timing requirements of each data switch 52 from other matrix processors 50. In some embodiments, double registers are used on all inputs, and all outputs are driven combinational. Such a double-register input configuration offers consistency for the matrix link read interrupts. When a matrix link read interrupt is set, the last word has just left the source data switch 52 and the word is buffered in the destination's input register.

Instruction Pipeline Special-Purpose Registers

In some embodiments, each matrix processor 50 includes a number of special-purpose registers 55 used by pipeline 54 to control the operation of its corresponding data switch 52. Such registers may be hard-coded, or, if software-programmable, writable only by the kernel. In some embodiments, the data switch control special-purpose pipeline registers include an identification (ID) register, a hardware configuration (HC) register, a software configuration (SC) register, and a port and link (PL) register.

The ID register stores a hard-coded matrix processor ID, which is unique for each matrix processor 50 of matrix 24. Table 2 illustrates an exemplary 32-bit ID register according to some embodiments of the present invention.

TABLE 2

| Identification Register |
|---|
| 31 30 29 28 27 26 25 24 23 22 21 20 19 18 17 16 15 14 13 12 11 10 9 8 7 6 5 4 3 2 1 0 |
| ID |

| Field | Bits | Description |
|---|---|---|
| ID[31:0] | 31:0 | Identification Register |

The Hardware Configuration (HC) register stores hard-coded vertical and horizontal position indexes identifying the fixed vertical and horizontal position of matrix processor 50 within matrix 24. The processor positions specified by the HC register are used by routing algorithms implemented by data switch 52, as described in detail below. Table 3 illustrates an exemplary HC register according to some embodiments of the present invention.

TABLE 3

| Hardware Configuration Register | | |
|---|---|---|
| 31 30 29 28 27 26 25 24 23 22 21 20 19 18 17 16 15 14 13 12 11 10 9 8 7 6 5 4 3 2 1 0 | | |
| Reserved | V | H |

| Field | Bits | Description |
|---|---|---|
| V[7:0] | 15:8 | Vertical Coordinate in the Matrix |
| H[7:0] | 7:0 | Horizontal Coordinate in the Matrix |

The Software Configuration (SC) register of each matrix processor 50 may store a programmable index identifying the number (LastV) of active processors in the current column. In some embodiments, the contents of the SC register may be written only by the kernel. All matrix processors 50 in a column have the same LastV value, but different columns may have different LastV values. In embodiments in which access to the North memory subsystem (32a, 34a) is daisy-chained for the matrix processors 50 in a given column, the number of matrix processors serviced by the current memory arbiter 68 may be used to provide each matrix processor 50 equal access to the memory subsystem, independently of vertical processor position within the column. If the North memory subsystem is the only memory subsystem present and one of the matrix processors 50 in a column fails (e.g. is not capable of accessing external memory), the matrix processors below the failed matrix processor in that column no longer have access to external memory and may be deemed to have also failed. Their data switches 52 of such matrix processors may still be functional and employed for inter-processor communications. Table 4 illustrates an exemplary SC register according to some embodiments of the present invention.

TABLE 4

| Software Configuration Register | |
|---|---|
| 31 30 29 28 27 26 25 24 23 22 21 20 19 18 17 16 15 14 13 12 11 10 9 8 7 6 5 4 3 2 1 0 | |
| Reserved | LastV |

| Field | Bits | Description |
|---|---|---|
| LastV[7:0] | 7:0 | Last Vertical Coordinate in the current Matrix column (default value 0) |

In embodiments using a multi-threaded pipeline 54, each port of data switch 52 may be allocated for exclusive use by a single thread at a time. The Port and Link (PL) register of each matrix processor 50 may store a set of memory port and inter-processing link assignment indexes, each indicating a thread to which a corresponding local memory port, direct memory port, or matrix link is assigned. In some embodiments, the contents of the PL register may be written only by the kernel. Table 5 shows en exemplary organization of a Port and Link register for a 4-thread pipeline 54.

TABLE 6

Data Switch Configuration Parameters

| Parameter | Range | Description |
| --- | --- | --- |
| ID | 0-0xffffffff | Matrix Processor Identification |
| V | 0-255 | Vertical Coordinate in the Matrix |
| H | 0-255 | Horizontal Coordinate in the Matrix |

TABLE 5

Port and Link Register

| 31 30 | 29 28 | 27 26 | 25 24 | 23 22 | 21 20 | 19 18 | 17 16 | 15 14 | 13 12 | 11 10 | 9 8 | 7 6 | 5 4 | 3 2 | 1 0 |
| --- | --- | --- | --- | --- | --- | --- | --- | --- | --- | --- | --- | --- | --- | --- | --- |
| DM-3T | DM-2T | DM-1T | DM-0T | LM-3T | LM-2T | LM-1T | LM-0T | L7-Thd | L6-Thd | L5-Thd | L4-Thd | L3-Thd | L2-Thd | L1-Thd | L0-Thd |

| Field | Bits | Description |
| --- | --- | --- |
| DM3Thd[1:0] | 23:22 | Direct Memory Port 3 is assigned to user thread DM3Thd (default value 0) |
| DM2Thd[1:0] | 21:20 | Direct Memory Port 2 is assigned to user thread DM2Thd (default value 0) |
| DM1Thd[1:0] | 19:18 | Direct Memory Port 1 is assigned to user thread DM1Thd (default value 0) |
| DM0Thd[1:0] | 17:16 | Direct Memory Port 0 is assigned to user thread DM0Thd (default value 0) |
| LM3Thd[1:0] | 23:22 | Local Memory Port 3 is assigned to user thread DM3Thd (default value 0) |
| LM2Thd[1:0] | 21:20 | Local Memory Port 2 is assigned to user thread DM2Thd (default value 0) |
| LM1Thd[1:0] | 19:18 | Local Memory Port 1 is assigned to user thread DM1Thd (default value 0) |
| LM0Thd[1:0] | 17:16 | Local Memory Port 0 is assigned to user thread DM0Thd (default value 0) |
| L7Thd[1:0] | 15:14 | Data Switch Link 7 is assigned to user thread L7Thd (default value 0) |
| L6Thd[1:0] | 13:12 | Data Switch Link 6 is assigned to user thread L6Thd (default value 0) |
| L5Thd[1:0] | 11:10 | Data Switch Link 5 is assigned to user thread L5Thd (default value 0) |
| L4Thd[1:0] | 9:8 | Data Switch Link 4 is assigned to user thread L4Thd (default value 0) |
| L3Thd[1:0] | 7:6 | Data Switch Link 3 is assigned to user thread L3Thd (default value 0) |
| L2Thd[1:0] | 5:4 | Data Switch Link 2 is assigned to user thread L2Thd (default value 0) |
| L1Thd[1:0] | 3:2 | Data Switch Link 1 is assigned to user thread L1Thd (default value 0) |
| L0Thd[1:0] | 1:0 | Data Switch Link 0 is assigned to user thread L0Thd (default value 0) |

Data Switch Structure

Figure 3:
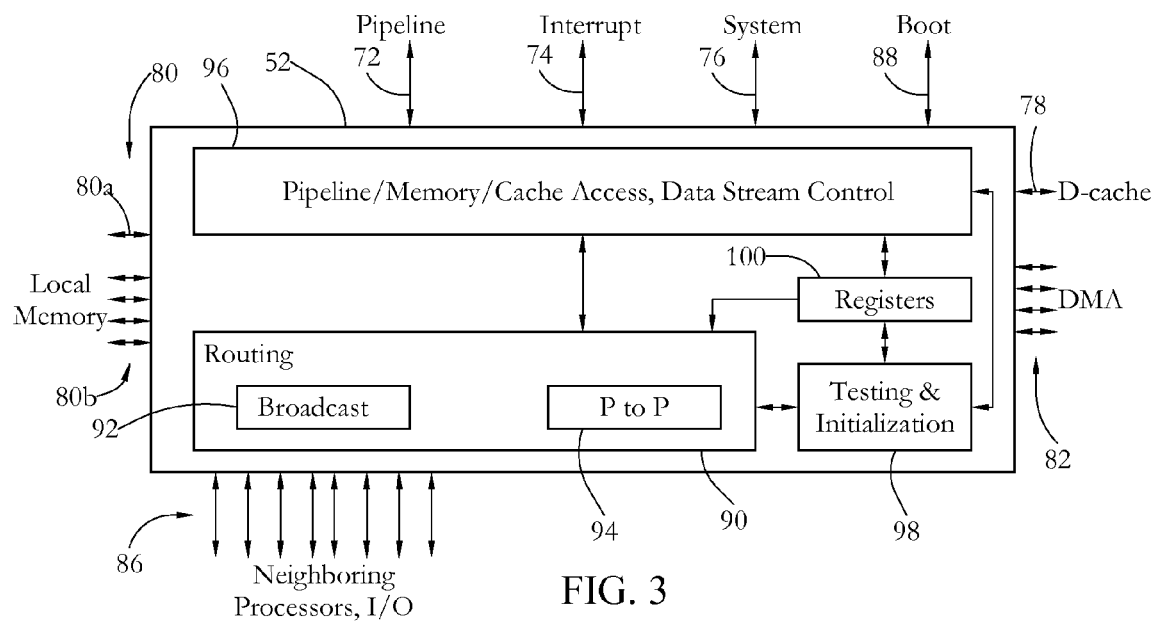
FIG. 3 shows an exemplary internal structure of a data switch of the matrix processor of FIG. 2-A, according to some embodiments of the present invention.

FIG. 3 shows an exemplary structure of a data switch 52 and its external connections according to some embodiments of the present invention. Data switch 52 includes matrix routing logic 90 configured to control the routing of matrix messages, pipeline & memory access logic 96 configured to control pipeline access (input/output) and memory access (read/write, including stream) operations, and testing & initialization logic 98 configured to perform a set of testing and initialization steps described below. In some embodiments, a part of testing & initialization logic 98 may be present and/or operable only in some matrix processors 50, such as the upper left or left-column matrix processors 50. Routing logic 90 includes broadcast routing logic 92 configured to route broadcast messages sent to multiple/all matrix processors, and processor-to-processor routing logic 94 configured to route processor-to-processor messages having individualized destinations. Pipeline & memory access logic 96 includes logic configured to perform a number of data streaming operations responsive to the execution of stream instructions. Data switch 52 further includes a number of special-purpose registers 100.

In some embodiments, each data switch 52 is configured according to a set of configuration parameters set at synthesis time. Such configuration parameters may include the contents of identification (ID) and hardware configuration (HC) special-purpose registers described above. Table 6 lists exemplary data switch configuration parameters corresponding to the ID and HC special-purpose registers described above.

In some embodiments, each data switch 52 includes a number of interfaces for connecting to pipeline 54, local memory 62, direct memory controller 64, and neighboring matrix processors 50, among others. As shown in FIG. 3, data switch 52 may include a pipeline interface 72, an interrupt interface 74, a system controller interface 76, a D-cache interface 78, a local memory interface 80, a direct memory interface 82, a matrix interface 86, and a boot interface 88. Local memory interface 80 includes one or more ports 80a dedicated to instruction processing pipeline access, and one or more streaming ports 80b which can be used to stream data to/from local memory 62.

Data switch pipeline interface 72 includes one or more fields for communicating with pipeline 54. Pipeline interface 72 may include an input command field identifying the data switch access command (e.g. nop, load, store, stream), input data switch address and write data fields, and an output read data field, among others. Input and output directions may be defined with respect to data switch 52. Other fields may include an input thread identifier field, as well as output exception (e.g. link busy) and interrupt fields (e.g. one for each thread). For example, in some embodiments interrupt signals are sent by data switch 52 to pipeline 54 when a user thread does a load or store and the data is not available or cannot be accepted; the requesting thread is preempted to let other threads do useful work while the requesting thread waits, and pipeline 54 is not stalled. When the data becomes available (for loads) or can be accepted (for stores), data switch 52 asserts the corresponding interrupt signal for one cycle. In response, pipeline 54 transitions the thread state from a waiting state to ready. For kernel load and store operations, pipeline 54 may be stalled when the data is not available or cannot be accepted.

In some embodiments, data switch interrupt interface 74 may include one or more interrupt fields, such as software reset, non-maskable, matrix, memory read (e.g. local memory and direct memory), and matrix link read interrupts, among others. Data switch system controller interface 76 may include one or more fields for communicating to system controller 61, such as read data, write data, and address fields. Data switch data D-cache interface 78 may include one or more fields for communicating to data cache 60b, such as data cache command, data cache virtual address, read data and write data fields.

Local memory pipeline access port 80a may include one or more fields for allowing pipeline 54 to communicate with local memory 62, such as local memory command, local memory address, read data and write data fields. Local memory streaming ports 80b may include one or more fields allowing data streaming to/from local memory 62. For example, in some embodiments local memory streaming ports 80b may include four streaming write and four streaming read ports, with each streaming write port including output write data and request-to-send fields and an input write clear-to-send field, and each streaming read port including input read data and interrupt fields, and input and output flow control fields. Local memory 62 may include arbitration logic allowing only one of ports 80a-b access to local memory 62 on any given clock cycle. Pipeline access port 80a may be non-blocking, and may have priority access over local memory streaming ports 80b.

In some embodiments, data switch direct memory interface 82 may include one or more ports dedicated to instruction processing pipeline access, and one or more streaming ports which can be used to stream data to/from direct memory controller 64. A direct memory pipeline-access port may include one or more fields for allowing pipeline 54 to communicate to direct memory controller 64, such as direct memory command, direct memory address, read data and write data fields. Direct memory streaming ports may include one or more fields, allowing data streaming to/from direct memory controller 64. For example, in some embodiments the direct memory streaming ports may include four streaming write and four streaming read ports, with each streaming write port including output write data and write confirmation request fields, and input and output flow control fields, and each streaming read port including input read data and interrupt fields, and input and output flow control fields.

In some embodiments, data switch matrix interface 86 may include a data write, data read, control write, and control read interface for each matrix link (0-7) connected to data switch 52. Each data write and control write interface may include corresponding output write data and input and output flow control fields, while each data read and control read interface may include input read data and input and output flow control fields. The data write and data read interfaces may include output data write interrupt and input data read interrupt fields, respectively.

Data switch boot interface 88 may include one or more fields for communicating with a boot FSM of boot controller 38. Boot interface 88 may include a boot address interface including input boot address and boot address request-to-send fields, and an output boot address clear-to-send field, and a boot data interface including output boot data and boot data request-to-send fields and an input boot data clear-to-send field. In some embodiments, only some data switches 52, for example only the data switches in the left-most matrix processor column, include and/or use boot interface 88.

Data Switch Transactions and Special-Purpose Registers; Data Streaming

In some embodiments, the local memory, inter-processor, and DMA interfaces of data switch 52 include streaming ports configured to stream data to and from local memory 62, external memory (DMA controller 64), immediately neighboring matrix processors 50, and immediately-neighboring I/O interfaces 26a-b in response to stream instructions, described below. Each matrix processor 50 may use load/store instructions to read/write data from/to the streaming ports of its data switch 52, and may also initiate one or more non-blocking data streams to be transferred in the background by data switch 52 without interruption while pipeline 54 continues normal execution over multiple clock cycles and other data and/or control messages are transferred over the corresponding data and/or control channels. The load/store instructions transfer words one at a time (one word per instruction) between memory-mapped matrix processor ports and processing pipeline registers, while the data streams transfer multiple words over multiple consecutive clock cycles, one word per cycle, between different memory-mapped data switch ports.

In some embodiments, a data stream is initiated by a stream instruction executed by pipeline 54. Each stream instruction takes as arguments the source, destination(s), and size of the data stream. The source may be any one of local memory 62, external memory (DMA controller 64), a neighboring matrix processor 50, or, for processors along the East/West edges, an I/O interface 26a-b. The destination(s) may include local memory 62, external memory (DMA) 64, and/or a neighboring matrix processor 50 or I/O interface 26a-b. In some embodiments, the size of the data stream may be fixed by the stream instruction argument, or may be variable in the case of streams received from neighboring matrix processors 50, to be determined by the data source. When the stream source has sent a last word of a variable-length stream, an interrupt is issued by the stream source, signaling that the stream transmission has completed. Variable-length data streams are particularly useful for data incoming from a neighboring matrix processor. In some embodiments, in order to improve performance, when a source matrix processor initiates a data stream to one of its immediate neighbors (a destination processor), the destination processor initiates its own data stream from the matrix port connected to the source to a buffer within the destination processor local memory.

Table 7 shows all transactions supported by each data switch 52 according to some embodiments of the present invention. As shown in the last four lines of Table 7, supported data streaming instructions include a data streaming instruction transferring a data stream from local memory to one or more matrix links, a data streaming instruction transferring a data stream from a matrix link to local memory, a data streaming instruction transferring a data stream from a matrix link to one or more matrix links, and a data streaming instruction transferring a data stream from a matrix link to local memory and one or more matrix links. Data switch 52 includes suitable logic and registers (e.g. stream control/multiplexing logic and stream state registers) configured to implement each instruction. The fields ds_addr and ds_cmd shown in Table 7 may be data switch address and command input fields forming part of pipeline interface 72. All combinations not shown in Table 7 may be treated as illegal. In some embodiments, the upper 4 KBytes (ds_addr [15:12]==4' hf) of the matrix Link Data Ports can be read and written only by the kernel, and an attempt by a user thread to access this space causes an illegal memory transaction exception.

TABLE 7

Data Switch Transactions

| ds_addr | | | | ds_cmd | |
|---|---|---|---|---|---|
| 31:28 | 27:24 | 23:16 | 15:0 | [3:0] | Description |
| 0xxx | xxxx | | | 0001, 0010, 0011 | Load Byte/Half-Word/Word from DCache |
| 0xxx | xxxx | | | 0101, 0110, 0111 | Store Byte/Half-Word/Word to DCache |
| 0xxx | xxxx | | | 1000 | DCache Consistency Synchronization |
| 0xxx | xxxx | | | 1010 | Invalidate DCache Line Unconditionally |
| 0xxx | xxxx | | | 1011 | Invalidate DCache Line if Valid |
| 0xxx | xxxx | | | 1100 | Flush DCache Line |
| 0xxx | xxxx | | | 1101 | Flush and Invalidate DCache Line |
| 0xxx | xxxx | | | 1110 | Flush DCache Line and wait cmw_int |
| 0xxx | xxxx | | | 1111 | Flush and Invalidate DCache Line and wait cmw_int |
| 10xx | xxxx | | | 0001, 0010, 0011 | Load Byte/Half-Word/Word from Local Memory |
| 10xx | xxxx | | | 0101, 0110, 0111 | Store Byte/Half-Word/Word to Local Memory |
| 1100 | 00ss | | | 0011 | Load Word from Direct Memory Control Port ss |
| 1100 | 01ss | | | 0011 | Load Word from Local Memory Control Port ss |
| 1100 | 1xxx | | | 0011 | Load Word from Data Switch Control |
| 1100 | 00dd | | | 0111 | Store Word to Direct Memory Control Port dd |
| 1100 | 01dd | | | 0111 | Store Word to Local Memory Control Port dd |
| 1100 | 1xxx | | | 0111 | Store Word to Data Switch Control |
| 1101 | 00ss | | | 0011 | Load Word from Direct Memory Data Port ss |
| 1101 | 1sss | | addr (1) | 0011 | Load Word from OVP Link Data sss (ds_addr [15:0] is used only by source coprocessors and I/O blocks) |
| 1101 | 00dd | | 0 | 0111 | Store Word to Direct Memory Data Port dd |
| 1101 | 00dd | | 4 | 0111 | Store Word to Direct Memory Data Port dd and request a confirmation |
| 1101 | 10xx | mask | addr (1) | 0111 | Store Word to all OVP Link Data selected by the mask. Send a Read Interrupt to the Matrix Processor destinations if ds_addr [2] == 1. (ds_addr [15:0] is used only by destination coprocessors and I/O blocks) |
| 1110 | xxxx | | | 0011 | Load Word from System Controller |
| 1110 | xxxx | | | 0111 | Store Word to System Controller |
| 00ss | 00dd | | | 0100 | Stream from Direct Memory Data Port ss to Direct Memory Port dd |
| 00ss | 01dd | | | 0100 | Stream from Direct Memory Data Port ss to Local Memory Port dd |
| 01ss | 00dd | | | 0100 | Stream from Local Memory Data Port ss to Direct Memory Port dd |
| 01ss | 01dd | | | 0100 | Stream from Local Memory Data Port ss to Local Memory Port dd |
| 01ss | 10xx | mask | addr (1) | 0100 | Stream from Local Memory Data Port ss to OVP Link Data selected by the mask (the addr field is used only by dest. coprocessors and I/O blocks) |
| 1sss | 01dd | | addr (1) | 0100 | Stream from OVP Link Data sss to Local Memory Port dd (the addr field is used only by source coprocessors and I/O blocks) |
| 1sss | 10xx | mask | addr (1) | 0100 | Stream from OVP Link Data sss to OVP Link Data selected by the mask (the addr field is used only by source and dest. coprocessors and I/O blocks) |
| 1sss | 11dd | mask | addr (1) | 0100 | Stream from OVP Link Data sss to Local Memory Port dd and OVP Link Data selected by the mask (the addr field is used only by source and destination coprocessors and I/O blocks) |

In some embodiments, when a stream ends or when a store is done with the least significant bit (LSB) set, the source matrix processor 50 may drive a link-specific (0,7) data read interrupt signal over a link data read interface of a matrix link 86, which, if the data stream goes to other matrix processors, in turn may drive a link-specific data write interrupt signal over a link data write interface of a matrix link 86 and a matrix link read interrupt signal over interrupt interface 74.

In some embodiments, a data switch 52 may simultaneously (on the same clock cycle) transfer words belonging to multiple data streams between different streaming ports, with the maximum number of data streams handled simultaneously being limited only by the availability of streaming ports. Data switch 52 may include a register for storing a data switch stream state, which is checked every time a stream instruction is received. Data switch 52 also includes stream multiplexing logic for concurrently (on the same cycle) receiving data on one streaming port and sending the data on multiple streaming ports.

In some embodiments, thread preemption may occur when a load/store is executed from/to D-Cache 60*b*, one of the direct memory ports 82 or matrix links 86. When D-Cache 60*b* is involved, D-Cache 60*b* may assert a data cache interrupt signal for the corresponding thread over D-cache interface 78. For direct memory and matrix links, data switch 52 may assert a data switch interrupt signal for the corresponding thread over pipeline interface 72.

In some embodiments, a number of resources of each data switch 52 are programmable by the kernel, and attempts to write to this address space by a user thread cause an Instruction Address Exception. Table 8 shows a set of programmable data switch resources according to some embodiments of the present invention. Each of the registers listed in Table 8 is described in further detail below.

TABLE 8

Data Switch Address Map

| Address | Description |
|---|---|
| 0xc800_0000 | Data Switch Link Register |
| 0xc800_0004 | Data Switch Time-Out Register |
| 0xc800_0008 | Data Switch Status Register |
| 0xc800_000c | Data Switch Message Read Register (read only) |
| 0xc800_0040-0xc800_007f | Data Switch Message Write Register (write only) - for I/O messages |
| 0xc810_0000-0xc81f_fffc | Data Switch Message Write Register (write only) - for Matrix Messages |

The data switch link register may be used to enable/disable matrix links. Table 9 shows a number of fields of the data switch link register according to some embodiments of the present invention. The fields include a message-independent link enable field LinkEn specifying which matrix links are enabled for all messages, a broadcast link-enable field BcstEn specifying which links are enabled for sending broadcast messages, and a processor-to-processor (P-to-P) link enable field MsgEn specifying which links are enabled for sending processor-to-processor messages. Each field includes 8 bits, with the value of each bit specifying a link-enable status (enabled or disabled) for the corresponding matrix link and/or message type.

TABLE 9

Data Switch Link Register

| 31 30 29 28 27 26 25 24 | 23 22 21 20 19 18 17 16 | 15 14 13 12 11 10 9 8 | 7 6 5 4 3 2 1 0 |
|---|---|---|---|
| Reserved | BcstEn | MsgEn | LinkEn |

| Field | Bits | Description |
|---|---|---|
| BcstEn[7:0] | 23:16 | Link will route Matrix Processor Broadcast Messages - there is one bit for each Matrix Processor Link:<br>(0 - E, 1 - NE, 2 - N, 3 - NW, 4 - W, 5 - SW, 6 - S, 7 - SE) (default value 0xff) |
| MsgEn[7:0] | 15:8 | Link will route P-to-P Messages - there is one bit for each Matrix Processor Link:<br>(0 - E, 1 - NE, 2 - N, 3 - NW, 4 - W, 5 - SW, 6 - S, 7 - SE) (default value 0xff) |
| LinkEn[7:0] | 7:0 | Link Enable - there is one bit for each Matrix Processor Link:<br>(0 - E, 1 - NE, 2 - N, 3 - NW, 4 - W, 5 - SW, 6 - S, 7 - SE) (default value 0xff) |

In some embodiments, the kernel of the boot or master processor can disable matrix links on an individual basis using the message-independent LinkEn (link enable) bits in the data switch link register (see Table 9). This feature may be useful when a neighboring data switch 52 is defective, or when the boot/master processor kernel wants to partition the processor matrix in several processor domains. In addition, the boot/master processor kernel can disable processor-to-processor and broadcast message routing through some of the enabled matrix links using the MsgEn and BcstEn bits in the same register. When a matrix link has the LinkEn bit set and the MsgEn bit cleared, only processor-to-processor control messages that have the neighbor as a destination will be sent through the link. When a matrix link has the LinkEn bit set and the BcstEn bit cleared, no broadcast messages will be sent through the link. These features may be useful when a neighbor has too few enabled matrix links to be useful in processor matrix control message routing, when the matrix link is connected to a coprocessor that does not support the full matrix processor link protocol, or the matrix link is connected to an I/O block. After a hard- or soft reset, the data switch link register may be set to 0xffffff.

In some embodiments, a number of additional registers may be used to control the operation of each data switch 52. TableTable 10 through Table 15 show a number of such exemplary data switch registers, including time-out, status, message read, and message write (for processor-to-processor and I/O messages) registers.

TABLE 10

Data Switch Time-Out Register

| 31 30 29 28 27 26 25 24 23 22 21 20 19 18 17 16 | 15 14 13 12 11 10 9 8 7 6 5 4 3 2 1 0 |
|---|---|
| Reserved | TimeOut |

| Field | Bits | Description |
|---|---|---|
| TimeOut[15:0] | 15:0 | Message delivery Time-Out (default value 0x00ff) |

TABLE 11

Data Switch Status Register

| 31 30 29 28 27 26 25 24 23 22 21 20 19 18 17 16 15 14 13 12 11 10 9 8 7 6 5 4 3 2 1 0 |
|---|
| Reserved　　　　　M　MB　D　RdLink　B　　SrcV　　　　SrcH |

| Field | Bits | Description |
|---|---|---|
| WrBusy | 19 | The Message Write register is busy, i.e. the previous message was not sent yet |
| RdBusy | 18 | The Message Read register is busy (the previous message was not read). After reading the Message Read register, the kernel needs to clear this bit to make the Message Read register available for the next message. |
| RdDrop | 17 | The Matrix Processor received at least one more message that was dropped because the Data Switch timed-out on the busy Message Read register (RdBusy set) |
| RdLink[2:0] | 19:17 | Read Link - the read message arrived on RdLink (read-only): (0 - E, 1 - NE, 2 - N, 3 - NW, 4 - W, 5 - SW, 6 - S, 7 - SE) |
| Broadcast | 16 | Broadcast - if RdBusy, the message in the Message Read register is a Broadcast message (read-only): 0 - P-to-P message 1 - broadcast message |
| SrcV[7:0] | 15:8 | Vertical Coordinate of the Source Matrix Processor (read-only) |
| SrcH[7:0] | 7:0 | Horizontal Coordinate of the Source Matrix Processor (read-only) |

In some embodiments, in the Status register, only the WrBusy, RdBusy, and RdDrop bits are writable, and all other fields are read-only. In some embodiments, after a hard or soft reset, the Time-Out register is set to 0x00ff, and the WrBusy, RdBusy, and RdDrop bits in the Status register are cleared.

In some embodiments, each data switch 52 includes two Message registers, a read-only Message Read register and a write-only Message Write register. Table 14 shows an exemplary address used to write a matrix (P-to-P or broadcast) message, and Table 15 shows an address used to write an I/O message to the Message Write register.

TABLE 12

Data Switch Message Read Register

| 31 30 29 28 27 26 25 24 23 22 21 20 19 18 17 16 15 14 13 12 11 10 9 8 7 6 5 4 3 2 1 0 |
|---|
| MsgRead |

| Field | Bits | Description |
|---|---|---|
| MsgRead[31:0] | 31:0 | Message Read |

TABLE 13

Data Switch Message Write Register

| 31 30 29 28 27 26 25 24 23 22 21 20 19 18 17 16 15 14 13 12 11 10 9 8 7 6 5 4 3 2 1 0 |
|---|
| MsgWrite |

| Field | Bits | Description |
|---|---|---|
| MsgWrite[31:0] | 31:0 | Message Write (Hardware Messages use only the least significant 16 bits) |

TABLE 14

Data Switch Message Write Register Address for Matrix Messages

| 31 30 29 28 | 27 26 25 24 | 23 22 21 20 | 19 | 18 | 17 16 15 14 13 12 11 10 9 8 | 7 6 5 4 3 2 1 | 0 |
|---|---|---|---|---|---|---|---|
| 1100 | 1000 | Reserved | 1 | B SM | DstV | DstH | 0 |

| Field | Bits | Description |
|---|---|---|
| Broadcast | 19 | Broadcast:<br>0 - P-to-P message (DstV and DstH are sent during the first cycle)<br>1 - broadcast message (DstV and DstH are not sent) |
| SoftMsg | 18 | Software Message:<br>0 - Hardware Message (will be processed by the destination Data Switch);<br>1 - Software Message (will set the OVP Matrix Interrupt at the destination Matrix Processor); |
| DstV[7:0] | 17:10 | Vertical Coordinate of the Destination Matrix Processor (used only for P-to-P messages) |
| DstH[7:0] | 9:2 | Horizontal Coordinate of the Destination Matrix Processor (used only for P-to-P messages) |

TABLE 15

Data Switch Message Write Register Address for I/O Messages

| 31 30 29 28 | 27 26 25 24 | 23 22 21 20 19 18 17 16 15 14 13 12 11 10 9 8 7 6 | 5 | 4 3 | 2 1 | 0 |
|---|---|---|---|---|---|---|
| 1100 | 1000 | Reserved                                           0 | 1 | SM | WrLink | 0 |

| Field | Bits | Description |
|---|---|---|
| SoftMsg | 16 | Software Message:<br>0 - Hardware Message (will be processed by the destination Data Switch);<br>1 - Software Message (will set the OVP Matrix Interrupt at the destination); |
| WrLink[2:0] | 4:2 | Write Link (the write message will be sent on WrLink):<br>(0 - E, 1 - NE, 2 - N, 3 - NW, 4 - W, 5 - SW, 6 - S, 7 - SE) |

In some embodiments, co-processors include fully-functioning data switches and are used for routing matrix messages. In some embodiments, co-processors include data switches with limited functionality, used for sending/receiving I/O messages to/from one or more immediately neighboring matrix processors 50 but not for routing matrix messages through the co-processor.

Matrix Control Message Streaming: Sending, Receiving

In some embodiments, matrix processors 50 are capable of receiving and sending a set of matrix control messages as described below. The matrix control interfaces of each matrix processor may be used only by the matrix processor kernel to exchange control messages with other matrix processor kernels. The matrix control messages may be broadcast or processor-to-processor messages. In some embodiments, matrix link control messages are sent multiplexed on a 17-bit bus (one bit flag and 16 bits of data) in two, three, or four consecutive cycles. Each data switch 52 is responsible for routing all control messages without any software (pipeline) involvement. Depending on how they are processed at the destination, the messages may be categorized as hardware and software messages. Hardware messages are processed by the data switch hardware. Software messages are saved in an internal data switch register and an OVP Matrix Interrupt is set so the messages can be serviced by the kernel. Table 16 shows exemplary fields that are sent on the matrix link (OVP Link) control interface and Tables 17-20 depict the structures of four exemplary categories of messages.

TABLE 16

Matrix Link Control Interface Fields

| 31 30 29 28 27 26 | 25 24 23 22 21 20 19 18 17 | 16 | 15 14 13 12 11 | 10 9 8 7 6 5 | 4 3 2 1 0 |
|---|---|---|---|---|---|
| NOT USED | | 0 | DstV | | DstH |
| NOT USED | | 1 | SrcV | | SrcH |
| NOT USED | | SM | | Message0 | |
| NOT USED | | 0 | | Message1 | |

| Field | Bits | Description |
|---|---|---|
| DstV[7:0] | 15:8 | Vertical Coordinate of the Destination Matrix Processor (used only for broadcast messages) |
| DstH[7:0] | 7:0 | Horizontal Coordinate of the Destination Matrix Processor (used only for broadcast messages) |
| SrcV[7:0] | 15:8 | Vertical Coordinate of the Source Matrix Processor (the Matrix Processor that sent this message) |
| SrcH[7:0] | 7:0 | Horizontal Coordinate of the Source Matrix Processor (the Matrix Processor that sent this message) |

TABLE 16-continued

Matrix Link Control Interface Fields

| Field | Bits | Description |
|---|---|---|
| SoftMsg | 16 | Software Message:<br>0 - Hardware Message (processed by the Data Switch);<br>1 - Software Message (will set the OVP Matrix Interrupt at the destination Matrix Processor); |
| Message0[15:0] | 15:0 | Most significant half of the Software Message |
| Message1[15:0] | 15:0 | Least significant half of the Software Message or the Hardware Message |

TABLE 17

P-to-P Software Message

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | NOT USED | | | | | | | | | 0 | | | | DstV | | | | | | | | DstH | | | | |
| | | | | | | NOT USED | | | | | | | | | 1 | | | | SrcV | | | | | | | | SrcH | | | | |
| | | | | | | NOT USED | | | | | | | | | 1 | | | | | | Message0 | | | | | | | | | | |
| | | | | | | NOT USED | | | | | | | | | 0 | | | | | | Message1 | | | | | | | | | | |

| Field | Bits | Description |
|---|---|---|
| DstV[7:0] | 15:8 | Vertical Coordinate of the Destination Matrix Processor (used only for broadcast messages) |
| DstH[7:0] | 7:0 | Horizontal Coordinate of the Destination Matrix Processor (used only for broadcast messages) |
| SrcV[7:0] | 15:8 | Vertical Coordinate of the Source Matrix Processor (the Matrix Processor that sent this message) |
| SrcH[7:0] | 7:0 | Horizontal Coordinate of the Source Matrix Processor (the Matrix Processor that sent this message) |
| Message0[15:0] | 15:0 | The first half (most significant) of the Software Message |
| Message1[15:0] | 15:0 | The secong half (least significant) of the Software Message |

TABLE 18

Broadcast Software Message

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | NOT USED | | | | | | | | | 1 | | | | SrcV | | | | | | | | SrcH | | | | |
| | | | | | | NOT USED | | | | | | | | | 1 | | | | | | Message0 | | | | | | | | | | |
| | | | | | | NOT USED | | | | | | | | | 0 | | | | | | Message1 | | | | | | | | | | |

| Field | Bits | Description |
|---|---|---|
| SrcV[7:0] | 15:8 | Vertical Coordinate of the Source Matrix Processor (the Matrix Processor that sent this message) |
| SrcH[7:0] | 7:0 | Horizontal Coordinate of the Source Matrix Processor (the Matrix Processor that sent this message) |
| Message0[15:0] | 15:0 | The first half (most significant) of the Software Message |
| Message1[15:0] | 15:0 | The secong half (least significant) of the Software Message |

TABLE 19

P-to-P Hardware Message

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | NOT USED | | | | | | | | | 0 | | | | DstV | | | | | | | | DstH | | | | |
| | | | | | | NOT USED | | | | | | | | | 1 | | | | SrcV | | | | | | | | SrcH | | | | |
| | | | | | | NOT USED | | | | | | | | | 0 | | | | | | Message1 | | | | | | | | | | |

| Field | Bits | Description |
|---|---|---|
| DstV[7:0] | 15:8 | Vertical Coordinate of the Destination Matrix Processor (used only for broadcast messages) |
| DstH[7:0] | 7:0 | Horizontal Coordinate of the Destination Matrix Processor (used only for broadcast messages) |
| SrcV[7:0] | 15:8 | Vertical Coordinate of the Source Matrix Processor (the Matrix Processor that sent this message) |

TABLE 19-continued

P-to-P Hardware Message

| SrcH[7:0] | 7:0 | Horizontal Coordinate of the Source Matrix Processor (the Matrix Processor that sent this message) |
| Message1[15:0] | 15:0 | Hardware Message |

TABLE 20

Broadcast Hardware Message

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | NOT USED | | | | | | | | | 1 | | | SrcV | | | | | | | | SrcH | | | | | |
| | | | | | | NOT USED | | | | | | | | | 0 | | | | | | Message1 | | | | | | | | | | |

| Field | Bits | Description |
|---|---|---|
| SrcV[7:0] | 15:8 | Vertical Coordinate of the Source Matrix Processor (the Matrix Processor that sent this message) |
| SrcH[7:0] | 7:0 | Horizontal Coordinate of the Source Matrix Processor (the Matrix Processor that sent this message) |
| Message1[15:0] | 15:0 | Hardware Message |

In some embodiments, a bit (e.g. bit 16) of the matrix link control interface is used to code the message categories, broadcast/P-to-P and hardware/software. If there are two, three, or four tokens that carry this bit, there is some redundancy in this bit that can be used to detect some of the tokens in the messages. For example, the last token in all messages may have bit 16 cleared. By observing bit 16 in two consecutive cycles, a data switch and/or processing pipeline may conclude the following: a 1 to 0 transition indicates the last two tokens of a message; two consecutive 0s indicate the last token of a message and the first token of a broadcast message; two consecutive 1s indicate the source address and the first half of a software message; a 0 to 1 transition indicate the source address in the second token.

In some embodiments, the kernel of the boot or master matrix processor 50 controls the matrix links of all matrix processors 50 using the LinkEn, MsgEn, and BcstEn bits in the data switch link register (see Table 9).

In some embodiments, for internal matrix links (links connected to another matrix processor or a co-processor, all stores to the Message Write register using the address described in Table 15 may be considered a nop. When a neighboring data switch 52 is defective, or when the boot/master processor kernel wants to partition the processor matrix in several processor domains, the kernel may set the corresponding LinkEn to 0. In this case, no matrix control messages are sent through the corresponding matrix link.

In some embodiments, if a neighboring matrix processor has too few enabled matrix links to be useful in matrix control message routing, or when the neighbor is a coprocessor that does not support the full matrix link protocol, the boot/master processor kernel may set the corresponding LinkEn to 1 and MsgEn to 0; in this case, only matrix control messages that have the neighbor as a destination will be sent through it. When the neighbor is a fully functional Matrix Processor, the kernel may set the corresponding LinkEn and MsgEn to 1.

In some embodiments, when a matrix link goes outside matrix 24 (when the link is connected to an I/O block such as blocks 26a-b in FIG. 1), all stores to the Message Write register using the address described in Table 14Table may be considered a nop. When the I/O block is not present or defective, the kernel may set the corresponding LinkEn to 0. In this case, no control messages will be sent through the designated matrix link. Otherwise, the kernel may set the corresponding LinkEn to 1.

In some embodiments, only a matrix processor 50 directly connected to an I/O block (26a-b) can send control messages to the I/O block, and all such messages are point-to-point messages. Such messages may be either hardware or software messages. An I/O block may send control messages to any processor within matrix 24. To send messages to internal matrix processors 50, an I/O block may use the source address of the matrix processor 50 whose matrix link the message is using.

In some embodiments, each matrix processor 50 is capable of receiving matrix control messages as described below. When any of the control read clear-to-send lines of matrix interface 86 are asserted, the beginning of a matrix link control message is signaled. The messages may be prioritized using a round-robin scheme. If bit 16 of the first token is 0, this is a P-to-P message and bits [15:0] contain the coordinates of the destination matrix processor 50 and two or three more tokens will follow with the coordinates of the source matrix processor 50 and the message itself. If bit 16 of the first token is 1, this is a broadcast message and bits [15:0] contain the coordinates of the source matrix processor 50 and one or two more tokens will follow with the message itself.

For P-to-P messages, each data switch 52 may use DstH and DstV to determine the destination of the message. If (DstH==H && DstV==v), the destination of the message is the current matrix processor 50. In case of a pre-defined hardware message, data switch 52 may execute the message, even if the RdBusy flag is set in the Status register. In case of a software message, data switch 52 may buffer the next two or three tokens (SrcH, SrcV, and Message), and issue an OVP Matrix interrupt. If (DstH !=H||DstV !=V), data switch 52 may forward the message to one of the neighboring matrix processors 50. For broadcast messages, data switch 52 may buffer and interpret the message, and forward the message to the neighboring matrix processors.

In some embodiments, when a software message reaches one of its destinations, the destination issues an OVP Matrix interrupt on interrupt interface 74. The message is then available to be read from the data switch control space. The Status register (see Table 11Table) identifies the source matrix processor and whether the message is a broadcast or P-to-P message, while the Message Read register (see Table 12Table) provides the message. Hardware messages are not written to the Message Read register. The kernel may clear the OVP Matrix interrupt field in an Interrupt Status register and the RdBusy flag in the Data Switch Status register before the next message can be accepted. The RdBusy flag may be cleared by writing a 1 to it, while writing a 0 has no effect.

In some embodiments, the Time-Out register (see Table 10) specifies the maximum number of cycles an incoming message that has the current matrix processor as a destination can be stalled by its data switch 52 in case the Message Read register is busy (a previous message was received, the OVP Matrix interrupt was issued, and the interrupt was not cleared by the kernel). If the Message Read register is still busy after the time-out elapses, the incoming message may be dropped and the RdDrop flag may be set in the Status register. This time-out feature may be useful for avoiding blockages of matrix 24. The RdDrop flag may be cleared by writing a 1 to it, while writing a 0 has no effect.

In some embodiments, each matrix processor 50 is capable of sending matrix control messages as described below. Each matrix processor 50 executes a store to the Message Write register, which automatically sets the WrBusy flag in the Status register (see Table 11). Data switch 52 interprets the stored message, and sends the message starting with the first cycle in which no matrix control messages are received. When the last token leaves data switch 52, the WrBusy flag is cleared and the om_int interrupt is set. If another store to the Message Write register is executed before the previous message was sent, data switch 52 may stall pipeline 54 until data switch 52 can accept the new message. The kernel may either wait for the om_int interrupt, or check the WrBusy bit in the Status Register before writing again to the Message Write register. To avoid deadlocks, a Real-Time interrupt may be used to set a time-out. The kernel may cancel the message in the Message Write register and clear the WrBusy flag in the Status register by writing a 1 to it, while writing a 0 has no effect. In some embodiments, the write message cancel feature is used only during a reset sequence described below, in which matrix 24 generates a matrix map. The write message cancel feature is not used after the reset sequence, and the messages in the processor matrix clear-up after the programmed time-outs in the Data Switch Time-Out registers.

If a sender matrix processor 50 receives a reply from a destination in response to a sent message, a Real-Time interrupt may be used to set a time-out at the sender matrix processor 50, in order to avoid deadlocks in case the message does not reach its destination because of too many faulty data switches 52.

In some embodiments, some of the matrix control messages are hardware matrix control messages, handled in hardware by the receiving matrix processor 50. Table 21 shows a set of predefined hardware messages according to some embodiments of the present invention. Message 0 is Null message, i.e. no action is taken by the destination matrix processor 50. Message 1 causes a soft-reset in the destination matrix processor 50. A soft reset may include setting all internal data switch registers to their default values and setting a software reset interrupt signal on interrupt interface 74 to HIGH for one cycle, which may cause pipeline 54 to set all Special Purpose Registers to their default values and execute an unconditional jump to address 0. Message 2 causes a non-maskable interrupt. A non-maskable interrupt may include setting a non-maskable interrupt signal on interrupt interface 74 of the destination matrix processor 50 to HIGH until the signal is cleared by the kernel in the Interrupt Status register. Message 3 is used to request a reply from the destination with the ID register; the destination data switch 52 responds with a software message with the content of the ID register. Messages 4 through 7 are used by other kernels to write to the Data Switch Control registers; which may be useful if a matrix processor 50 as a whole is not fully functional (e.g. includes a non-functional pipeline 54), but includes a functional data switch 52 which is used to route control messages. Message 8 is used to control the destination matrix processor power supply voltage and message 9 to control the clocks. All other hardware messages in Table 21 may be reserved for future upgrades.

TABLE 21

Predefined Hardware Messages

| Message | Description |
| --- | --- |
| 0x0000 | Null Message |
| 0x0001 | Software Reset |
| 0x0002 | Non-Maskable Interrupt |
| 0x0003 | ID register request |
| 0x0004 | Set the Data Switch Link and Time-Out registers to their default values, and clear the WrBusy, RdBusy, and RdDrop bits in the Data Switch Status register |
| 0x0005 | Write the Message to the Data Switch Time-Out register |
| 0x0006 | Write the Message to the least significant half of the Data Switch Link register |
| 0x0007 | Write the Message to the most significant half of the Data Switch Link register |
| 0x0008 | Control Matrix Processor power supply voltage |
| 0x0009 | Control Matrix Processor clocks |
| 0x000a-0xffff | Reserved for future hardware upgrades |

Default Matrix Message Routing

In some embodiments, matrix control messages are routed by data switches 52 as described below. Matrix control messages may be routed automatically by each data switch 52 according to the source position (SrcH, SrcV), current position (CurrH, CurrV) and the destination position (DstH, DstV), using the matrix links that are enabled in the data switch link register (see Table 9). P-to-P messages are interpreted only by the matrix processor 50 with the H and V coordinates that match DstH and DstV, and broadcast messages are interpreted by all matrix processors 50 except the source matrix processor.

FIG. 4-A shows an exemplary P-to-P message path between a source matrix processor having coordinates [4,6] and a destination matrix processor with coordinates [1,e], according to some embodiments of the present invention. FIG. 4-B shows exemplary pseudo-code describing the message routing along the path of FIG. 4-A. As shown in FIG. 4-B, if the destination is reached, an interrupt is issued. To choose a matrix link for routing, P-to-P routing logic 94 (FIG. 3) compares the differences in vertical and horizontal position between the current matrix processor and destination matrix processor. If one difference is more than double the other in absolute size, routing logic 94 employs the horizontal or vertical matrix link corresponding to the larger position difference; a diagonal link is chosen otherwise. For example, for the choice of routing link by the matrix processor [4,6] for a message with destination[1,e], the routing logic 94 of the [4,6] matrix processor determines the difference in horizontal position DeltaH=e-6=8 (in decimal notation, 14−6=8), the difference in vertical position DeltaV=1-4=−3, and compares the two differences. Routing logic 94 may determine the link quadrant to use according to the signs of the two differences. If DeltaH>0 and DeltaV <=0, the first (upper right) link quadrant is chosen. Then, if the absolute value of DeltaH is larger than the absolute value of DeltaV, the East link is chosen, i.e. the link to matrix processor [4,7].

FIG. 5-A shows an exemplary set of paths of a broadcast message sent by a source matrix processor having coordinates [4,6], according to some embodiments of the present invention. The source matrix processor may be a master matrix processor or a selected matrix processor otherwise enabled to send broadcast messages. FIG. 5-B shows exemplary pseudo-code describing the message routing along the paths of FIG. 5-A. The source processor uses all available links to send the message, as shown for the matrix processor [4,6] in FIG. 5-A. Other processors determine which links to use according to comparisons of the differences in horizontal and vertical positions between the current matrix processor and source matrix processor. For example, diagonal links are used if the horizontal and vertical differences are equal (i.e. if the current processor and the source processor are along a common diagonal line), horizontal links of the appropriate sign are used if the absolute horizontal difference is larger than or equal to the absolute vertical difference, and vertical links of the appropriate sign are used if the absolute vertical difference is larger than or equal to the absolute horizontal difference.

The exemplary routing methods described with references to FIGS. 4-A-B and 5-A-B may lead to suboptimal results if some of the matrix links fail. In some embodiments, each data switch 52 implements a fault-tolerant routing algorithm that takes advantage of the redundancy of matrix links to route message around failed matrix links.

In some embodiments, matrix 24 includes a number of fault-tolerance components for improving the tolerance of matrix 24 to multiple matrix processor failures. The fault-tolerance of matrix 24 is facilitated by the redundant link structure shown in FIG. 1, which allows messages to be routed around matrix processors with a failed data switch or that are otherwise incapable of inter-processor communication. Matrix 24 also performs a self-test at power-on to identify which matrix processors 50 and matrix links are operational, so that applications make use only of functional matrix processors 50. At the end of the test, each matrix processor 50 knows if any of its neighboring matrix processors 50 or matrix links are defective. If any matrix processor 50 is not operational, but its data switch 52 is, all control messages may be routed correctly by the operational data switch 52. If the data switch 52 itself is not operational, the neighboring data switches 52 may re-route all control messages around the defective data switch. Such fault tolerance features allow using a matrix 24 with multiple failures for most applications, and thus allow improving the yield of a semiconductor manufacturing process used to make matrix 24. Such fault tolerance features also provide a self-healing capability after the chips have been deployed in the field.

In some embodiments, a map of functional and failed matrix links 86 and matrix processors 50 is generated by performing a self-test at power on as described below. Any system application then makes use only of functional matrix processors 50. At the end of the test, each matrix processor 50 will know if any of its immediate neighbor matrix processors 50 or matrix links 86 are defective. If any matrix processor 50 is not operational, but its data switch 52 is, all control messages can be routed correctly by the data switch 52. If the data switch 52 itself is not operational, the neighboring data switches 52 will re-route all control messages.

In some embodiments, a set of matrix link-enable status indicators resulting from the system self-test are used in fault-tolerant P-to-P and broadcast routing algorithm by each matrix processor 50 as described below. FIG. 6-A shows an exemplary P-to-P message path between a source matrix processor having coordinates [4,6] and a destination matrix processor with coordinates [1,e] in the presence of some failed matrix processors 50 and/or matrix links in between, according to some embodiments of the present invention. FIG. 6-B shows exemplary pseudo-code describing the fault-tolerant message routing along the path of FIG. 6-A. In FIG. 6-B, use_LinkABCD means that data switch 52 uses Link A if enabled, and if not, Link B, Link C, or Link D in this order. The link numbering is the one shown in FIG. 2-B. As shown, the pseudo-code of FIG. 6-B first selects an ordered list of matrix links (e.g. 0172, 1027, 1203, 2314, 3241, 3425, etc. in FIG. 6-B) according to a set of predetermined inequality relationships between the horizontal and vertical matrix position differences (Delta H, Delta V) between the current and destination matrix processors. From the selected ordered list, the first (highest-order) enabled link is selected as the matrix link for routing the message. The matrix link selected to route the message is the operational link with the direction closest to the message destination. The message is routed only if it gets closer to the destination. The message may be dropped otherwise, in order to avoid infinite loops. As described above, each sender may use a real-time interrupt to set a time-out if the sender is waiting for a reply.

Proxy P-to-P Matrix Message Routing

Figure 7:
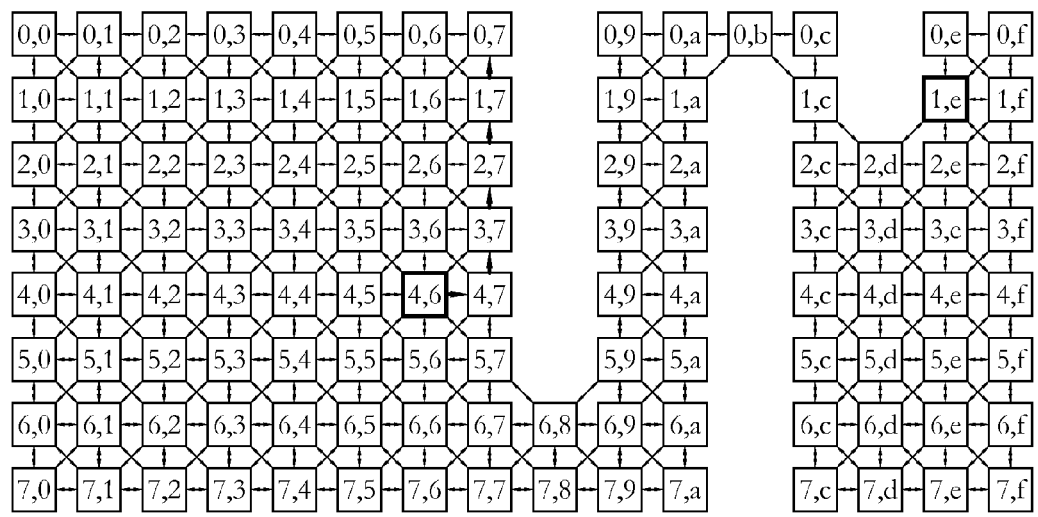
FIG. 7 shows an exemplary failed path of a processor-to-processor message in the presence of an exemplary configuration of inter-processor communication failures, according to some embodiments of the present invention.

FIG. 7 shows an exemplary P-to-P message path originating at a source matrix processor having coordinates [4,6] with a destination of [1,e] in the presence of a large number of data switch failures, routed according to the exemplary pseudo-code of FIG. 6-B. As shown, the routing method does not deliver the message to its destination in the presence of an excessive number of data switch failures and/or particular failure configurations.

In some embodiments, the boot or master processor may designate one or more proxy matrix processors to be used for forcing the routing of messages from given source matrix processors to given destination matrix processors through the proxies. A data structure identifying proxies to be used may be held in external memory or in the local memory of the master matrix processor.

Figure 8:
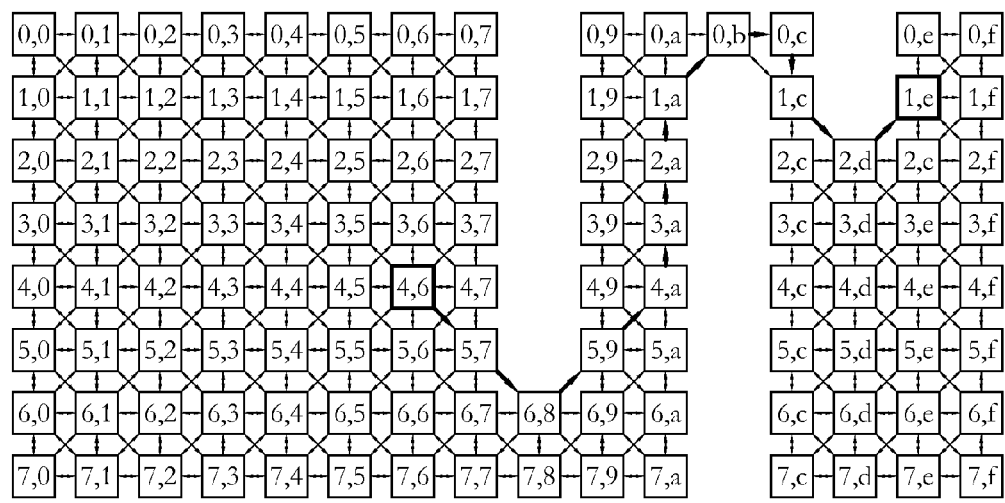
FIG. 8 shows an exemplary successful path of a processor-to-processor message through a proxy in the matrix of FIG. 6, according to some embodiments of the present invention.

FIG. 8 shows an exemplary P-to-P message path originating at a source [4,6] with a destination of [1,e], whose routing is forced to occur through a proxy [6,8], but otherwise is performed according to the pseudo-code of FIG. 6-B. The message path includes two stages, each of which occurs according to a default routing algorithm such as the one shown in FIG. 6-B. In the first stage, the message travels from the source matrix processor ([4,6] in FIG. 8) to the proxy ([6,8] in FIG. 8). In some embodiments, each software message to be routed through a proxy may be preceded or followed by a software message including an identifier of the final (post-proxy) message destination. In the second stage, after the message arrives at the proxy, the proxy's instruction-processing pipeline 54 identifies the message as one to be relayed to a post-proxy destination, identifies the final (post-proxy) destination and sends the message to the post-proxy destination. In some embodiments, more than one intermediate proxy may be used to route a message between some source-receiver pairs.

FIG. 9-A shows an exemplary set of paths of a broadcast message sent by a source matrix processor having coordinates [4,6] in the presence of a number of data switch failures, routed according to the exemplary pseudo-code of FIG. 5-B, according to some embodiments of the present invention. As shown, the routing method does not deliver the message to all its destinations, and in particular to destination in the shadow of defective data switches. Destination not reached by the sent message as shown in dashed lines in FIG. 9-A. In some embodiments, to ensure broadcast messages are received at all destinations, some messages (e.g. hardware messages) may be sent redundantly on all links, while some messages (e.g. software messages) may be sent broadcast within partitioned domains, as described below.

In some embodiments, broadcast hardware messages (BHM) are used for critical events. To ensure that such messages reach all matrix processors 50 for which a path exists, each data switch 52 may forward any received BHM on all matrix links except the matrix link on which the BHM was received. Because of the greedy nature of such a fault-tolerant algorithm, some data switches 52 will receive the same BHM several times. Each data switch 52 may remember a predetermined number of the latest BHMs in their entirety (Source and Message) and drop all consecutive identical BHMs. A BHM source does not send two consecutive identical BHMs; if a BHM to be sent is identical to an immediately-previous BHM sent by a source, the source may send a NULL BHM first to prevent the sending of two consecutive identical BHMs. Such a broadcasting algorithm guarantees that all data switches 52 are reached as long as there is a route from source to destination. Because an island of functional data switches 52 cannot be reached, the sender may use a real-time interrupt if the sender waits for a reply.

In some embodiments, broadcast software messages (BSM) are used more often than BHM; for such messages it may be particularly desirable to use matrix links more efficiently and to avoid the use of NULL messages. In some embodiments, in the absence of defective data switches 52, BSMs may be routed as described above with reference to FIGS. 5-A-B.

In some embodiments, if matrix 24 includes some defective data switches 52 or otherwise inoperative matrix links, a boot matrix processor 50 may determine during a system initialization process whether to partition matrix 24 in multiple broadcast domains, or to leave matrix 24 as a single broadcast domain and instead allow the broadcast message sender (e.g. the master matrix processor) to reach any shadowed matrix processors 50 by sending individual P-to-P messages to all matrix processors 50 in the shadow of defective data switches.

FIG. 9-B shows an exemplary partitioning of matrix 24 into three broadcast domains; inter-domain boundaries are illustrated by dashed lines in FIG. 9-B. To partition matrix 24, a boot or master matrix processor 50 may send P-to-P messages to each matrix processor 50 along the domain boundaries to set the BcstEn field in the data switch link register to a value disabling broadcast message transfer through the boundaries. The prospective sender matrix processor 50 (matrix processor (4,6) in FIG. 9-B) selects a domain-specific broadcast proxy (or broadcast master) for each partitioned domain other than its own (e.g. matrix processors (2,3) and (4,b) in FIG. 9-B), and sends to P-to-P messages to each selected proxy for broadcast within each corresponding domain. The original sender and each selected proxy then broadcasts the BSM within its broadcast domain according to the routing algorithm described with reference to FIGS. 5-A-B. Because an island of functional data switches 52 cannot be reached, each broadcast sender may use a real-time interrupt if the sender waits for a reply.

Boot/Reset/Initialization; Matrix Functionality Map, P-to-P and Broadcast Proxy Assignment In some embodiments, matrix 24 performs a number of initialization and testing steps upon hard and/or soft resets, as described below. Some or all of the testing/initialization steps described below may also be performed at periodic time intervals, for example once a day or after a predetermined number of hours has elapsed from the latest test. Information resulting from the testing/initialization is stored and used at two levels, locally and globally. Local information may be used in hardware-directed matrix message routing, and global information in software-directed decisions on assignments of matrix processors to application function, P-to-P proxy assignment, and broadcast domain partitioning and braodcast proxy assignment. Locally, each data switch 52 stores information about its matrix link functionality status indicators (message-independent enabled, broadcast-enabled, and/or P-to-P enabled) in its link status hardware, which is used for routing matrix messages. Globally, a matrix functionality map is stored in the local memory of the master matrix processor 50 and/or in external memory. At least parts of the matrix functionality map may be used to set local matrix link functionality status indicators. In some embodiments, a boot matrix processor 50 acts as a matrix mapping and proxy assignment unit, directing the generation of the matrix functionality map as described below; matrix 24 may be then thought to be formed by all matrix processors 50 outside of the boot matrix processor. In some embodiments, dedicated mapping and/or proxy assignment units/processors linked to matrix 24 may be provided separately from any matrix processor 50.

After a hard-reset, all matrix processors 50 are in a boot state. In the boot state, all user threads are in an idle state and the kernel of each matrix processor 50 is active. The matrix processors 50 in the first column (e.g. left-most column) start fetching instructions from the boot/reset address segment (see Table 1). The I-cache 60a (FIG. 2-A) of each matrix processor in the first column forwards the instruction fetching request to data switch 52, which assigns the requests to matrix data link 4 (West). The incoming data received in response to a each request is stored by I-cache 60a and executed by pipeline 54. The matrix processors 50 not in the first column stay in the boot state until receiving a Software Reset message.

In some embodiments, one of the matrix processors 50 in the first column is selected by a boot finite state machine (FSM) as a boot control processor. The boot FSM may form part of boot controller 38 (FIG. 2-A). For example, the top left (0,0) processor may be selected if functional. If the top left processor does not respond on matrix link 4 (West) with an interrupt after a predetermined number of cycles, the next processor (1,0) is selected and tested, and so on.

In some embodiments, the selected boot matrix processor 50 performs a boot sequence comprising a number of steps shown in FIG. 10-A. In a step 180, the selected boot matrix processor 50 performs a minimal chip initialization and self-test. In a step 182, the boot matrix processor 50 performs a store to a predetermined address corresponding to matrix link 4 (West) with destination Read Interrupt (e.g. address 0xd810_0004) to confirm that the selected boot matrix processor 50 is functional. In a step 186, the current application program and data are copied from NVM 40 (FIG. 1) to RAM 44a-b. In a step 188, the boot matrix processor 50 broadcasts a Control Message 0 (Software Reset) to reset all other matrix processors 50 in matrix 24. In a step 190, the boot code performs a jump to the Soft Reset handler (address 0), which is in the cacheable address space. The boot matrix processor 50 then transitions from the boot state to the normal execution state (step 192).

In some embodiments, after a hard-reset and before any application starts, each matrix processor 50 programs the Data Switch Link and Time-Out registers (see Tables 8-10), and the boot matrix processor 50 sends software messages to all other matrix processors to ensure a consistent configuration of all matrix processors 50 in matrix 24.

In some embodiments, after each software reset, the kernel of each matrix processor 50 may go through the steps shown in FIG. 10-B to identify which matrix links are functional and thus generate a matrix link functionality map. In a step 200, a P-to-P ID register request message is sent to each immediate neighbor over the corresponding matrix link. A time out is then set (step 202). The time-out may be set using a real-time interrupt or polling, and is sufficient to allow the immediate neighbors time to respond. For example, the time-out period may be chosen to be on the order of a few hundred clock cycles. Each kernel then waits to receive matrix (OVP) interrupts from the immediate neighbors (step 204), and the contents of the data switch link register (see Table 9) are set according to the received responses (step 206). If an immediate neighbor does not respond, the corresponding link is disabled using the LinkEn field of the data switch link register. If an immediate neighbor responds, the corresponding link is enabled using the same field.

In some embodiments, after the first broadcast Software Reset sent by the boot matrix processor 50, the kernel of the boot matrix processor 50 performs the steps of FIG. 10-B, and subsequently the sequence of steps shown in FIG. 10-C. In a step 220, a time out is set. The time-out may be set using a real-time interrupt or polling. The time-out period may be chosen to be on the order of a few thousand clock cycles. In a step 224, a broadcast ID register request message is sent to all matrix processors 50. A time-out sufficient to receive ID request responses (e.g. on the order of a few thousand clock cycles) is set using a real-time interrupt or polling (step 226). In some embodiments, P-to-P broadcast ID register request messages may be sent to all matrix processors 50 instead of a broadcast ID register request. The boot processor kernel waits to receive interrupts from matrix processors 50 (step 228), and subsequently builds a matrix map of functioning data switches and/or matrix links according to the received responses (step 230). The matrix map may include a data structure identifying the matrix positions of each functional and non-functional data switch 52. In a step 234, the boot processor kernel determines how each functioning data switch 52 can be reached, and generates a map of functional matrix links. In a step 236, the boot matrix processor kernel programs the special-purpose registers (described above) of all functioning data switches 52 using hardware control messages. The message independent link-enable field values (see Table 9) of the link status register are set to an enabled or disabled status according to the matrix link functionality map. In a step 238, the kernel may program at least some pipeline internal special purpose registers. After the sequence of steps of FIG. 10-C has been performed, the hardware of the boot matrix processor 50 and all directly reachable data switches 52 are initialized, and the topology of matrix 24 has been determined.

In some embodiments, the kernel of the boot matrix processor 50 subsequently performs a sequence of steps, shown in FIG. 10-D, to determine which matrix processors 50 include functional processor pipelines 54 and other processor components shown in FIG. 2-A, and not merely functional data switches 52, and to select P-to-P and/or broadcast proxies if needed. In a step 240, the kernel sends software control messages to all matrix processors 50 previously determined to have functional data switches 52. The software control messages request the recipient matrix processors 50 to perform a hardware self-test and report test result indicators/status to the boot matrix processor kernel. The self-test includes checking whether each matrix processor 50 can access (read/write to/from) external memory and local memory. In a step 242, the kernel sets a real-time interrupt or polling time-out sufficient to allow the self-tests and reporting to be performed. The kernel waits to receive interrupts from matrix processors 50 (step 244), and subsequently builds a matrix map of functioning matrix processors 50 according to the received responses (step 246). The matrix map may include a data structure identifying the matrix positions of each fully-functional and non-functional matrix processor 50.

In a step 248, one or more proxies are selected if needed to ensure adequate communication between matrix processors 50 in the presence of data switch failures. A proxy selection process may be started selectively only if it is possible that there are functioning data switches 52 whose ID messages could not reach the boot matrix processor 50. The proxy selection process may include a P-to-P proxy selection step and a broadcast proxy selection step.

In some embodiments, to identify a P-to-P proxy, the boot matrix processor kernel first determines whether a default (non-proxy) P-to-P routing algorithm (e.g. a routing algorithm such as the ones illustrated in FIGS. 4-A-B, 6-A-B and 7) will deliver messages from all sender matrix processors to all receiver matrix processors having functioning data switches. Such a determination may simulate message routing selectively in matrix regions having concentrated data switch/matrix link failures, for example a fraction of failed matrix links that exceeds a predetermined threshold in any matrix region (e.g. square) of predetermined size. When the default (non-proxy) routing algorithm would not succeed in delivering a message from a given sender to a given receiver, one or more proxy candidates may be evaluated to determine whether designating the candidate as a proxy would ensure delivery of the message from the sender to the receiver. The message would travel in each of its two stages (sender-proxy and proxy-receiver) according to the default routing algorithm, and each matrix processor along the message path would perform its routing decision according to the default routing algorithm. The proxy candidates may be chosen to be proximal to the edges of regions with relatively high densities of failed matrix links/data switches. If designating a proxy candidate as a proxy would cause P-to-P messages to be delivered from the sender to the receiver, the proxy candidate is designated as a proxy for the given sender/receiver pair. The identity of the selected proxy may be remembered and used as a proxy candidate for subsequent evaluations of different sender/receiver pairs. If a single proxy candidate is not found, the total message path may be divided into three segments corresponding to two sequential proxies between the source and destination. Higher numbers of proxies may be used if two proxies are not sufficient. Each proxy may be treated as a new destination, and a proxy identification process may be performed as described above for segments of the original source-destination path.

In some embodiments, to identify a broadcast proxy and corresponding broadcast domain boundaries, the boot matrix processor first determines whether a default (single-domain) broadcast routing algorithm (e.g. a routing algorithm such as the one illustrated in FIGS. 5-A-B and 9-A) will deliver a broadcast message from a broadcast sender (e.g. a prospective master matrix processor 50) to all other matrix processors 50 having functioning data switches. When the default broadcast routing algorithm would not succeed in delivering the broadcast message to at least some receivers, the boot processor kernel may determine whether to partition matrix 24 in multiple broadcast domains, or to leave matrix 24 as a single broadcast domain and instead allow the broadcast message sender (e.g. the master matrix processor) to reach any shadowed matrix processors 50 by sending individual P-to-P messages to all matrix processors 50 in the shadow of defective data switches. The boot processor kernel may first determine how many matrix processors would not be reached by a single-domain (default) broadcast message routing algorithm, and may determine one or more broadcast domain partition boundaries and broadcast proxy positions suitable for reaching the shadowed matrix processors 50. Tentative domain partition boundaries may be chosen to abut non-functioning data switches, while tentative broadcast proxy locations may be chosen to be generally centered within their corresponding domains. P-to-P message delivery may be chosen for example when the number of shadowed matrix processors meets a predetermined threshold condition (e.g. is less than 4 or 8), or if a domain partitioning able to reach the shadowed processors is not readily found using a number of broadcast domains meeting a predetermined threshold condition (e.g. less than 4 or 8 domains). Broadcast domain partitioning may be chosen for example when the number of shadowed matrix processors meets a predetermined threshold condition (e.g. is higher than or equal to 4 or 8), and a domain partitioning able to reach the shadowed processors is readily found using a number of broadcast domains meeting a predetermined threshold condition (e.g. less than or equal to 4 or 8 domains). Matrix 24 may be partitioned in multiple broadcast domains using the BcstEn field in the data switch link register (Table 9) of each data switch 52 along the domain boundaries.

If any P-to-P and/or broadcast proxies are selected, the sequences of steps shown in FIGS. 10-C and 10-D are repeated to identify which data switches 52 and matrix processors 50 are functional and reachable through the selected proxies (step 250). When the matrix mapping process has converged, matrix processors 50 are sent control messages with internal special-purpose register values for each matrix processor 50 (step 254). Following the above steps, the topology of matrix 24 has been determined and all hardware has been initialized. In a step 256, the boot matrix processor 50 (e.g. the top left processor) hands over control to a master matrix processor 50 (e.g. a centrally-located processor such as the [4,6] processor). The control handover may include transferring the data structure (or a pointer to the data structure) representing the data switch and/or matrix processor functionality map to the master matrix processor 50. In a step 260, the kernel of the master matrix processor 50 performs a software specific initialization and launches the application of interest.

In some embodiments, matrix 24 may include a number of power-saving features. Matrix 24 may use two levels of clock gating. A high level may be controlled by the link control messages 8 and 9 listed in Table 21), and a low level may be controlled by the hardware for each individual register; a register clock is enabled only when the register content needs to change. In addition, each matrix column may use a different clock and Vdd voltage. If different clocks and/or Vdd voltages are used in different columns, the matrix links between matrix columns with different clocks may include synchronization registers in order to avoid meta-stability. Moreover, in some embodiments some of the matrix columns (e.g. a number of columns on the right side of matrix 24 in FIG. 1) can be selectively shut down completely. Similarly, some individual matrix processors 50 (e.g. a number of bottom matrix processors 50 in particular columns) can be selectively shut down completely. When a number of matrix processors 50 at the bottom of a column are shut down, the the LastV field in the software configuration register (see Table 4) of the remaining active matrix processors 50 in the column may be set to the last active matrix processor 50 in the column.

In some embodiments, some of the matrix processors 50 include dedicated processing hardware rather than programmable pipelines 54. Such units may be used to implement functions for which high performance is particularly useful at low power levels. Such processing logic may implement mostly data path functions, and the hardware required may be relatively small and easy to design and verify. Such matrix processors 50 may include a data switch 52 and memory arbiter 68 (FIG. 2-A) as described above, and may behave on their external interfaces in the same way as programmable matrix nodes. For example, all link control messages may be routed identically in such matrix nodes as in programmable matrix nodes.

Exemplary systems and methods as described above allow addressing a number of limitations of conventional computer systems. Such limitations are of particular relevance for mobile devices, which incorporate increasingly complex functionality but are subject to stringent power constraints. Such limitations can be addressed by changes to both conventional hardware and software approaches. Exemplary systems and methods as described above allow employing a new hardware architecture that uses aspects of the serial algorithmic thinking that has been adopted by generations of software engineers and is thus difficult to change rapidly.

The evolution of semiconductor technology through scaling of feature sizes and transistor counts brings both benefits and challenges. Among the benefits is higher logic density. As logic gates are relatively inexpensive in terms of silicon area, complex functionality that was unthinkable until a few years ago is becoming commercially viable. At the same time, although the price per chip may go down, the tape-out cost has often gone up significantly, as have the development costs of complex SOCs (System-On-Chip). Other challenges include leakage current and power consumption in general, the ineffectiveness of attempts to increase performance by increasing clock frequency, and the common inability of memory bandwidth to keep up with increased logic performance. These limitations have led to the current developments in the areas of parallel processing, multicore, and mixed cores.

Multi-core systems face a different set of challenges, which are often related to inter-processor communications. Exemplary systems and methods as described above allow improved inter-processor communications, particularly in the presence of errors that disable at least some matrix processors and/or data switches. The exemplary fault tolerance aspects described above allow improvements in manufacturing yields as well as improved tolerance to failures in the field.

The above embodiments may be altered in many ways without departing from the scope of the invention. For example, a matrix may be a 3-D matrix including multiple stacked 2-D matrix layers, with matrix processors interconnected in-plane and along the stacking direction. Accordingly, the scope of the invention should be determined by the following claims and their legal equivalents.

What is claimed is:
1. A method comprising:
  determining whether a default matrix processor-to-processor routing algorithm would deliver an inter-processor message from a first matrix processor to a second matrix processor in a chip comprising a microprocessor matrix of mesh-interconnected matrix processors, wherein the message routed according to the default matrix processor-to-processor routing algorithm would be routed from the first matrix processor by a data switch in each matrix processor along a default message path originating at the first matrix processor;

in response to determining whether the default matrix processor-to-processor routing algorithm would deliver the message from the first matrix processor to the second matrix processor, when the default processor-to-processor routing algorithm would not deliver the message from the first matrix processor to the second processor, determining whether designating a third matrix processor as a proxy for the message would cause the message to be delivered to the second matrix processor using the default matrix processor-to-processor routing algorithm from the first matrix processor to the third matrix processor and subsequently from the third matrix processor to the second matrix processor, wherein the third matrix processor is not in the default message path;

in response to determining whether designating the third matrix processor as a proxy for the message would cause the message to be delivered to the second matrix processor, designating the third matrix processor as a proxy for the message when designating the third matrix processor as a proxy for the message would cause the message to be delivered to the second matrix processor; and determining whether the default processor-to-processor routing algorithm would deliver the inter-processor message from the first matrix processor to the second matrix processor upon each hard reset of the microprocessor matrix.

2. The method of claim 1, further comprising routing the message through the proxy processor to deliver the message to the second matrix processor.

3. The method of claim 1, wherein designating the third matrix processor as a proxy processor is performed by a boot matrix processor configured to perform a matrix boot sequence.

4. The method of claim 1, wherein determining whether the default matrix processor-to-processor routing algorithm would deliver the inter-processor message from the first matrix processor to the second matrix processor is performed according to a matrix functionality map designating a functional or non-functional status for each inter-processor link in the microprocessor matrix.

5. The method of claim 1, wherein the default matrix processor-to-processor routing algorithm determines a message propagation direction at a current matrix processor according to a difference between vertical position indexes of the current matrix processor and a destination matrix processor, and according to a difference between horizontal position indexes of the current matrix processor and the destination matrix processor.

6. An integrated circuit comprising:
a microprocessor matrix comprising a plurality of mesh-interconnected matrix processors integrated on a chip, wherein each matrix processor comprises a data switch configured to direct inter-processor communications within the matrix; and
a proxy identification unit configured to:
determine whether a default matrix processor-to-processor routing algorithm would deliver an inter-processor message from a first matrix processor to a second matrix processor, the message being routed according to the default matrix processor-to-processor routing algorithm along a default message path originating at the first matrix processor;
in response to determining whether the default matrix processor-to-processor routing algorithm would deliver the message from the first matrix processor to the second matrix processor, when the default processor-to-processor routing algorithm would not deliver the message from the first matrix processor to the second processor, determine whether designating a third matrix processor as a proxy for the message would cause the message to be delivered to the second matrix processor using the default matrix processor-to-processor algorithm from the first matrix processor to the third matrix processor and subsequently from the third matrix processor to the second matrix processor, wherein the third matrix processor is not in the default message path; and
in response to determining whether designating the third matrix processor as a proxy for the message would cause the message to be delivered to the second matrix processor, designate the third matrix processor as a proxy for the message when designating the third matrix processor as a proxy for the message would cause the message to be delivered to the second matrix processor;
wherein the proxy identification unit includes at least part of a boot matrix processor, wherein the at least part of the boot matrix processor is configured to perform a matrix boot sequence.

7. The integrated circuit of claim 6, wherein the proxy identification unit is configured to determine whether the default processor-to-processor routing algorithm would deliver the inter-processor message from the first matrix processor to the second matrix processor upon each hard reset of the microprocessor matrix.

8. The integrated circuit of claim 6, wherein determining whether the default matrix processor-to-processor routing algorithm would deliver the inter-processor message from the first matrix processor to the second matrix processor is performed according to a matrix functionality map designating a functional or non-functional status for each inter-processor link in the microprocessor matrix.

9. The integrated circuit of claim 6, wherein the default matrix processor-to-processor routing algorithm determines a message propagation direction at a current matrix processor according to a difference between vertical position indexes of the current matrix processor and a destination matrix processor, and according to a difference between horizontal position indexes of the current matrix processor and the destination matrix processor.

10. A method comprising:
sending an inter-processor message from a sender matrix processor to a receiver matrix processor through a proxy matrix processor in a chip comprising a microprocessor matrix of mesh-interconnected matrix processors, the message sent by the sender matrix processor designating the proxy matrix processor and the receiver matrix processor;
employing data switches in each matrix processor along a path of the message to route the message from the sender matrix processor to the receiver matrix processor through the proxy matrix processor using a default processor-to-processor routing algorithm from the sender matrix processor to the proxy matrix processor and subsequently from the proxy matrix processor to the receiver matrix processor, wherein a tentative non-proxy message sent by the sender matrix processor to the receiver matrix processor through the microprocessor matrix using the default processor-to-processor routing algorithm would not travel through the proxy matrix processor and would not reach the receiver matrix processor; and
determining whether the default processor-to-processor routing algorithm would deliver the inter-processor message from the first matrix processor to the second matrix processor upon each hard reset of the microprocessor matrix.

11. The method of claim 10, further comprising routing the message through the proxy processor to deliver the message to the second matrix processor.

12. The method of claim 10, comprising determining whether the default processor-to-processor routing algorithm would deliver the inter-processor message from the first matrix processor to the second matrix processor upon each hard reset of the microprocessor matrix.

13. The method of claim 10, wherein determining whether the default matrix processor-to-processor routing algorithm would deliver the inter-processor message from the first matrix processor to the second matrix processor is performed according to a matrix functionality map designating a functional or non-functional status for each inter-processor link in the microprocessor matrix.

14. The method of claim 10, wherein the default matrix processor-to-processor routing algorithm determines a message propagation direction at a current matrix processor according to a difference between vertical position indexes of the current matrix processor and a destination matrix processor, and according to a difference between horizontal position indexes of the current matrix processor and the destination matrix processor.

15. A chip comprising a microprocessor matrix of mesh-interconnected matrix processors, the microprocessor matrix comprising:
   a sender matrix processor integrated on the chip, the sender matrix processor including a data switch configured to send an inter-processor message to a receiver matrix processor through the microprocessor matrix, the message sent by the sender matrix processor including a designation of the receiver matrix processor and of a proxy matrix processor through which the message is to be routed;
   a receiver matrix processor integrated on the chip, the receiver matrix processor including a data switch configured to receive the message; and
   a proxy matrix processor integrated on the chip, the proxy matrix processor including a data switch configured to receive the message from the sender and to send the message to the receiver;
   wherein the message is routed by each matrix processor in a message path according to a default processor-to-processor routing algorithm from the sender matrix processor to the proxy matrix processor, and subsequently from the proxy matrix processor to the receiver matrix processor, and
   wherein a tentative non-proxy message sent by the sender matrix processor to the receiver matrix processor through the microprocessor matrix using the default processor-to-processor routing algorithm would not travel through the proxy matrix processor and would not reach the receiver matrix processor; and
   wherein the proxy identification unit includes at least part of a boot matrix processor, wherein the at least part of the boot matrix processor is configured to perform a matrix boot sequence.

16. The chip of claim 15, wherein the proxy identification unit is configured to determine whether the default processor-to-processor routing algorithm would deliver the inter-processor message from the first matrix processor to the second matrix processor upon each hard reset of the microprocessor matrix.

17. The chip of claim 15, wherein determining whether the default matrix processor-to-processor routing algorithm would deliver the inter-processor message from the first matrix processor to the second matrix processor is performed according to a matrix functionality map designating a functional or non-functional status for each inter-processor link in the microprocessor matrix.

18. The chip of claim 15, wherein the default matrix processor-to-processor routing algorithm determines a message propagation direction at a current matrix processor according to a difference between vertical position indexes of the current matrix processor and a destination matrix processor, and according to a difference between horizontal position indexes of the current matrix processor and the destination matrix processor.

* * * * *